United States Patent
Asnis

(10) Patent No.: US 8,538,071 B2
(45) Date of Patent: Sep. 17, 2013

(54) SYSTEM AND METHOD FOR TARGET SEPARATION OF CLOSELY SPACED TARGETS IN AUTOMATIC TARGET RECOGNITION

(75) Inventor: Gary I. Asnis, El Segundo, CA (US)

(73) Assignee: Raytheon Company, Waltham, MA (US)

(*) Notice: Subject to any disclaimer, the term of this patent is extended or adjusted under 35 U.S.C. 154(b) by 1008 days.

(21) Appl. No.: 12/406,922

(22) Filed: Mar. 18, 2009

(65) Prior Publication Data

US 2010/0239170 A1    Sep. 23, 2010

(51) Int. Cl.
    G06K 9/00    (2006.01)
(52) U.S. Cl.
    USPC ........... 382/103; 382/100; 382/155; 382/159; 382/173; 382/190; 382/195; 382/224; 382/225
(58) Field of Classification Search
    USPC ............. 382/100, 103, 155–160, 170, 171, 382/173, 180, 181, 190–195, 199, 203, 205, 382/224, 225
    See application file for complete search history.

(56) References Cited

U.S. PATENT DOCUMENTS

| | | | | |
|---|---|---|---|---|
| 4,661,985 A | * | 4/1987 | Akutsu | 382/110 |
| 5,027,413 A | * | 6/1991 | Barnard | 382/103 |
| 5,341,439 A | * | 8/1994 | Hsu | 382/103 |
| 6,072,889 A | * | 6/2000 | Deaett et al. | 382/103 |
| 6,992,629 B2 | | 1/2006 | Kerner et al. | |
| 7,305,129 B2 | * | 12/2007 | Chellapilla et al. | 382/174 |
| 7,305,145 B2 | * | 12/2007 | Forman et al. | 382/291 |
| 7,536,365 B2 | * | 5/2009 | Aboutalib | 706/15 |
| 2005/0157931 A1 | * | 7/2005 | Delashmit et al. | 382/190 |
| 2008/0088519 A1 | | 4/2008 | Quan et al. | |

OTHER PUBLICATIONS

Jinping Zhang, Wei Zhao, Gong Cheng and Shiyi Mao, "Compounding Segmentation Method for SAR Images" 8th International Conference on Signal Processing, IEEE, Nov. 2006, pp. 1-4.*

Céline Tison, Nadine Pourthié and Jean-Claude Souyris, "Target recognition in SAR images with Support Vector Machines (SVM)" IEEE International Geoscience and Remote Sensing Symposium, IEEE, Jul. 2007, pp. 456-459.*

E. J. Hughes, M. Lewis and C. M. Alabaster, "Automatic Target Recognition: The Problems of Data Separability and Decision Making" The Institution of Engineering and Technology Seminar on High Resolution Imaging and Target Classification, IEEE, Nov. 2006, pp. 29-37.*

* cited by examiner

*Primary Examiner* — Eric Rush

(74) *Attorney, Agent, or Firm* — Christie, Parker & Hale, LLP

(57) ABSTRACT

The Target Separation Algorithms (TSAs) are used to improve the results of Automated Target Recognition (ATR). The task of the TSAs is to separate two or more closely spaced targets in Regions of Interest (ROIs), to separate targets from objects like trees, buildings, etc., in a ROI, or to separate targets from clutter and shadows. The outputs of the TSA separations are inputs to ATR, which identify the type of target based on a template database. TSA may include eight algorithms. These algorithms may use average signal magnitude, support vector machines, rotating lines, and topological grids for target separation in ROI. TSA algorithms can be applied together or separately in different combinations depending on case complexity, required accuracy, and time of computation.

11 Claims, 26 Drawing Sheets

Clusters Separation Using Cluster Average Signal Magnitude $$P_{border} = P : \{\Delta P_j \xrightarrow{j} \max\}, P \in [P_{min}, P_{max}]$$

Targets and Clutter Separation using Average Signal Magnitude

Fig. 18 Clutter Filtering

Fig. 19 Target Restoring

Clusters Separation using Straight Lines Rotating around Center of Cluster

Optimal Linear Border Separated Two Targets

Clusters Separation using Horizontal Grids 1

Clusters Separation using Horizontal Grids 2

Clusters Separation using Horizontal Grids 3

Linear Border Separating Targets Using Horizontal Grids 4

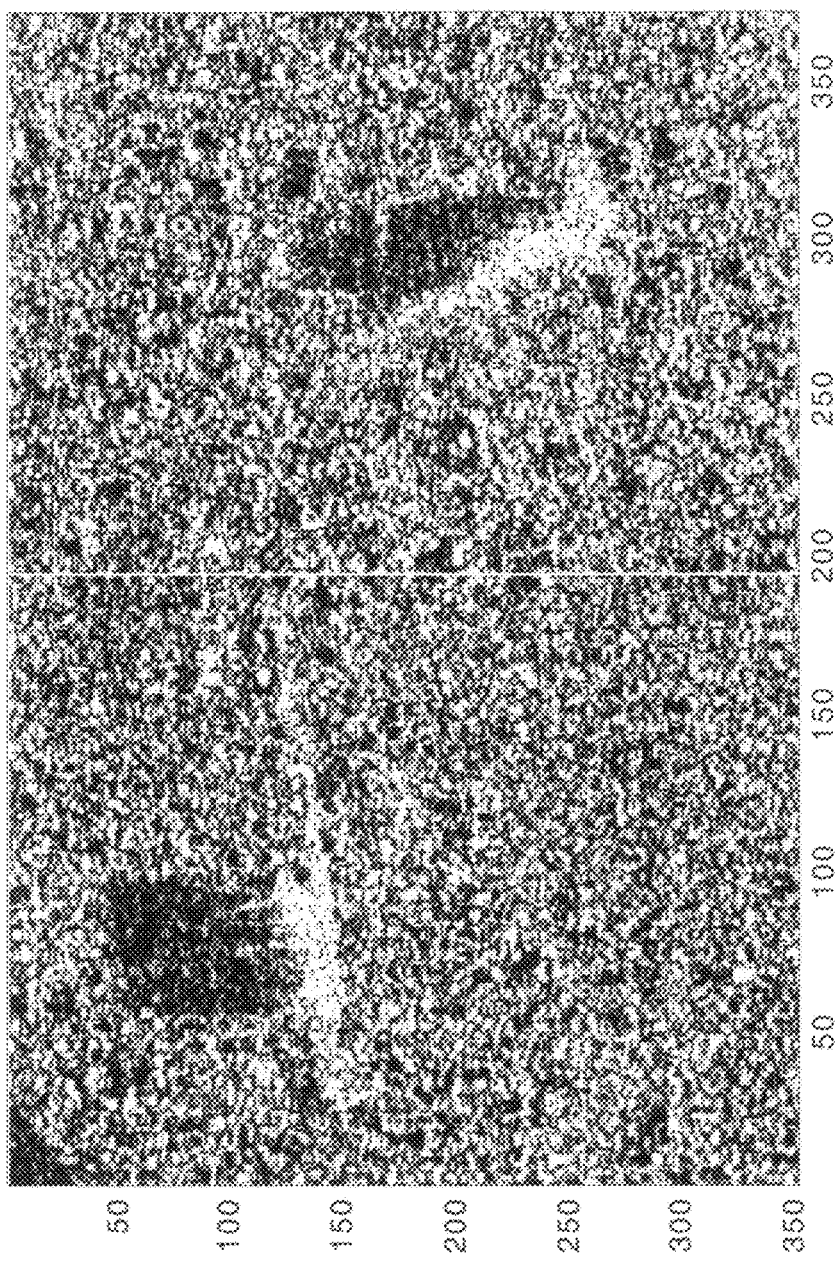
Fig. 26 Two Targets Separated in ROI by Linear Border

SYSTEM AND METHOD FOR TARGET SEPARATION OF CLOSELY SPACED TARGETS IN AUTOMATIC TARGET RECOGNITION

BACKGROUND OF THE INVENTION

Imaging applications such as synthetic aperture radar (SAR) create two-dimensional maps (bitmaps) of regions, where the images consist of a two-dimensional grid of different signal strengths (magnitudes). These grids break down further into regions of interest (ROIs, also called chips), that is, regions where there is something other than background being imaged, such as objects or possible targets (objects of interest). Chips break down into clusters, that is, sets of pixels having a particular property, such as a similar signal magnitude. The chips are processed to reveal any objects (e.g., cars, trees, buildings, etc.) that the imaging application detected as well as any objects of interest (also known as targets, and include predefined objects such as tanks, planes, etc.). Automated target recognition (ATR) is a process that identifies targets based on a template database.

ATR uses target images for input. Distinct target images—that is, each target separately identified and differentiated from background (clutter) or other objects—enhance ATR reliability. The differentiation of objects from background, of objects of interest (targets) from other objects, and of targets from other targets are thus important, but often difficult, processes.

There is a need for improved separation of closely spaced targets in a ROI for applications such as SAR. Improved target recognition results in improved ATR.

SUMMARY OF THE INVENTION

The system and method of the invention separate multiple objects appearing in regions of interest (ROIs) of imaging applications such as synthetic aperture radar (SAR). More specifically, the system takes images (two-dimensional grids of signal magnitudes) along with ROIs within the images (and clusters of pixels within each ROI) and identifies and separates objects from background (clutter), targets (objects of interest) from other objects, and targets from targets. In particular, in one embodiment, the system uses eight different approaches:

(1) rough separation of targets and objects from clutter and shadow using average signal magnitude,
(2) separation of two clusters by signal magnitude,
(3) separation of multiple clusters by signal magnitude,
(3A) clutter filtering (removal of small areas of clutter),
(3B) target restoring (filling in of small gaps in a target),
(4) target separation using support vector machines (identifying a border between two or more targets of different average signal magnitude),
(5) target separation using rotating lines (rotating a line about a center of mass to separate two or more clusters), and
(6) target separation using horizontal and vertical grids.

The system works in two stages. Stage 1 uses average signal magnitude to do the separation, as typified by Algorithms 1, 2, 3, 3A, 3B, and 4. Stage 2 uses topological (geometrical) methods for the separation, as typified in Algorithms 5 and 6. Either stage is optional, as are any of the algorithms.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 26 shows the original image with the resulting linear border from the rotating lines approach shown in FIG. 21.

DETAILED DESCRIPTION OF EXEMPLARY EMBODIMENTS

The illustrative embodiments that follow are only exemplary applications of the present invention and not intended to limit the scope of the invention.

The Target Separation Algorithms (TSAs) improve the results of the Automatic Target Recognition (ATR) process in imaging applications like Synthetic Aperture Radar (SAR) bitmap interpretation. Before attempting to identify specific targets using ATR, it helps to separate the different objects and targets (objects of interest) from the background and from each other.

Figure 1:
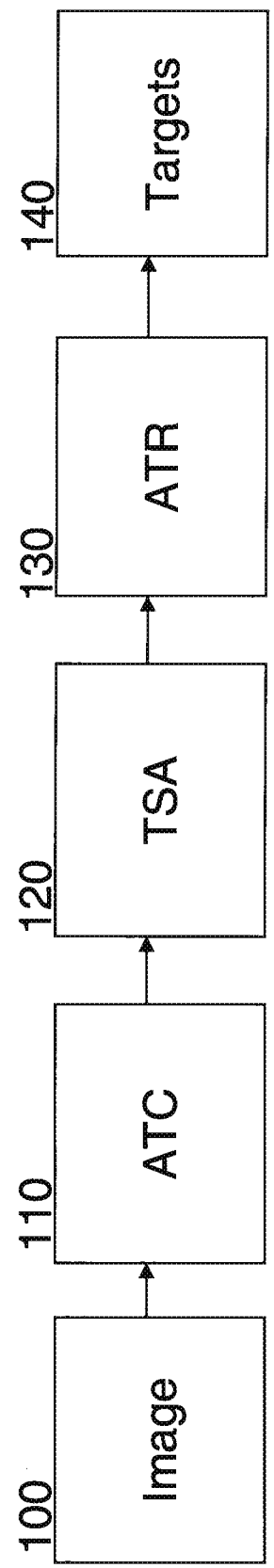
FIG. 1 is a functional block diagram illustrating an overview of the target recognition process in an exemplary embodiment of the invention.

The automatic recognition process is shown on FIG. 1. The input for this process is a SAR image (bitmap) 100. Three coordinates characterize each pixel of this image: the row number x and column number y in the bitmap along with the signal magnitude P(x, y). The first step of recognition is Automated Target Cueing (ATC) 110. In this step, the system localizes Regions of Interest (ROIs, also called chips) in the SAR bitmap. Chips are small areas on the bitmap which contain possible targets. Then ATC deletes all chips that contain no possible target images. The second step—Automated Target Recognition (ATR) 130—recognizes each image in each chip and identifies whether the image is a target 140 (along with type and label of this target).

When one chip contains two or more closely spaced targets, however, or when a target in close proximity to objects (like trees, buildings, etc.), ATR either does not recognize targets in the chip or recognizes them incorrectly. The TSAs 120 work between ATC and ATR to improve the recognition process. The TSAs separate two (or more) closely spaced targets or separate targets 140 from objects in chips (see FIGS. 2-4).

Figure 2:
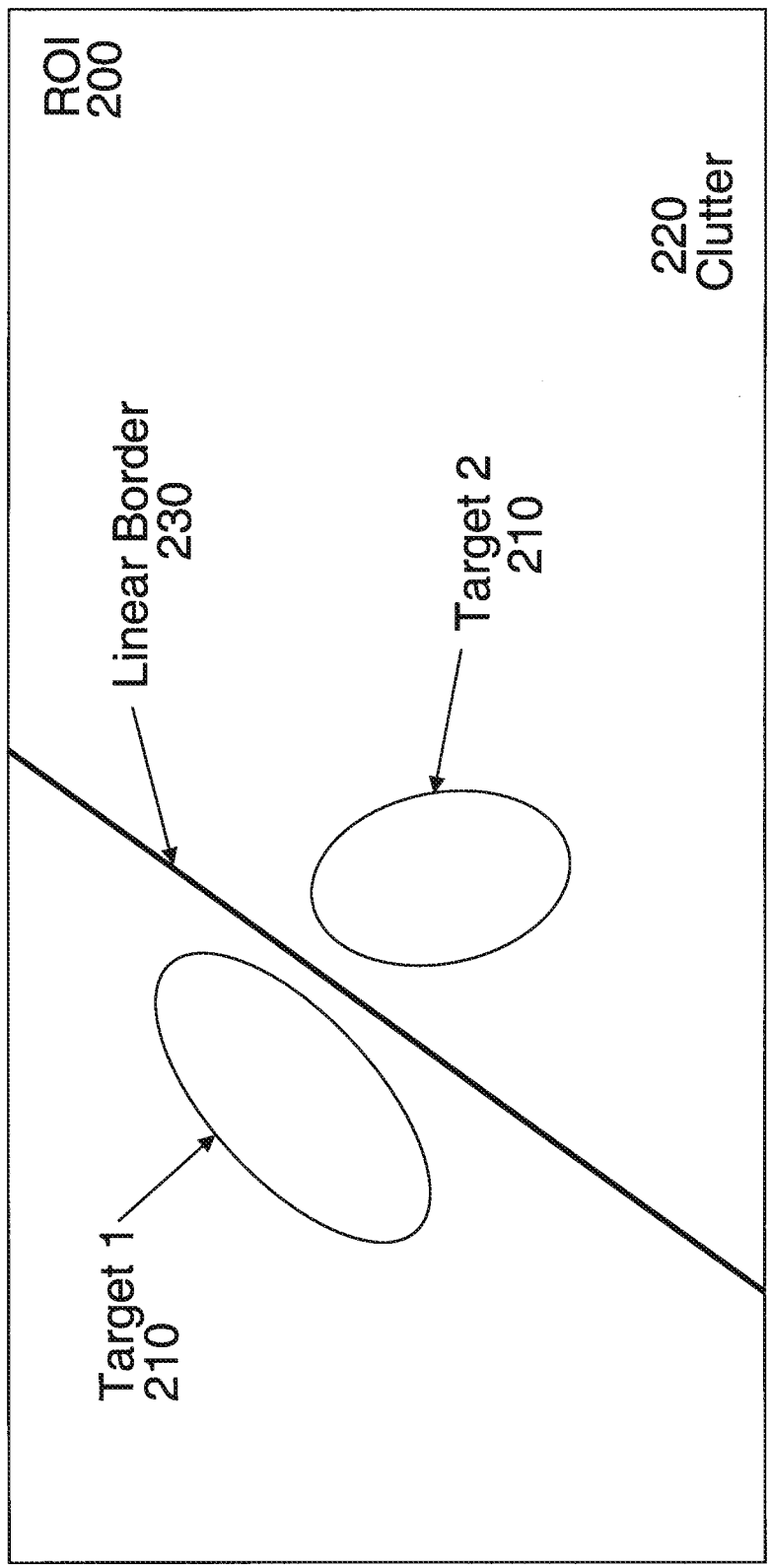
FIG. 2 illustrates a goal of the invention, namely the separation of two closely spaced targets in a ROI (region of interest, or chip) by a linear border.

In FIG. 2, the example chip 200 contains two targets 210 that are distinguishable from the surrounding background (clutter) 220. A linear border 230 separates the two targets.

Figure 3:
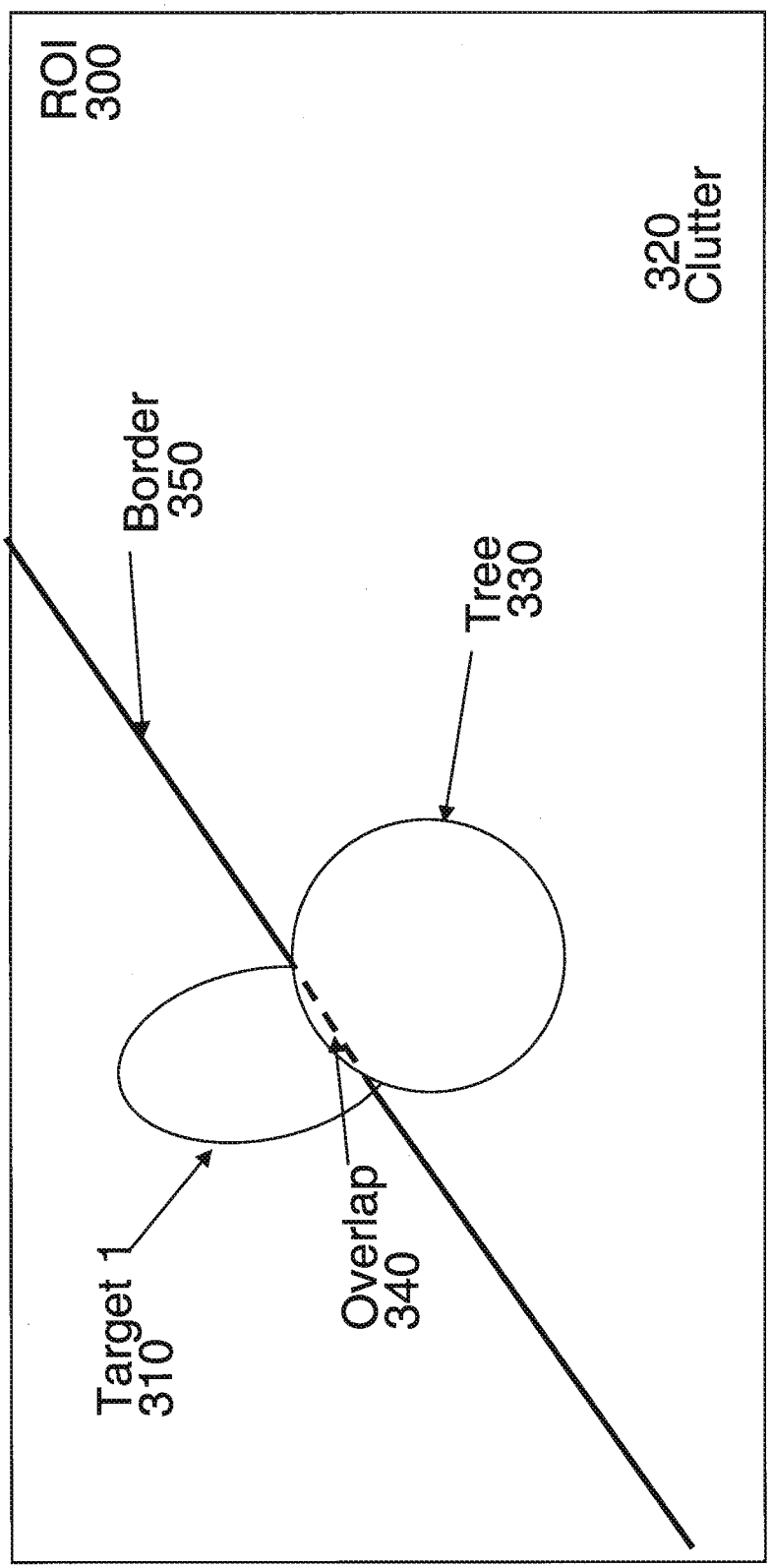
FIG. 3 depicts a more challenging objective of the invention, namely the separation of a target (object of interest) from a nearby overlapping object (in this case a tree) in a ROI, again using a linear border.

FIG. 3 is similar. There is still a chip 300, target 310, and clutter 320, but another object, in this case a tree 330, replaces the second target. Furthermore, the tree intersects with the target in an overlap region 340. This causes the linear border 350 to intersect a small portion of the tree in this linear separation of target from tree.

Figure 4:
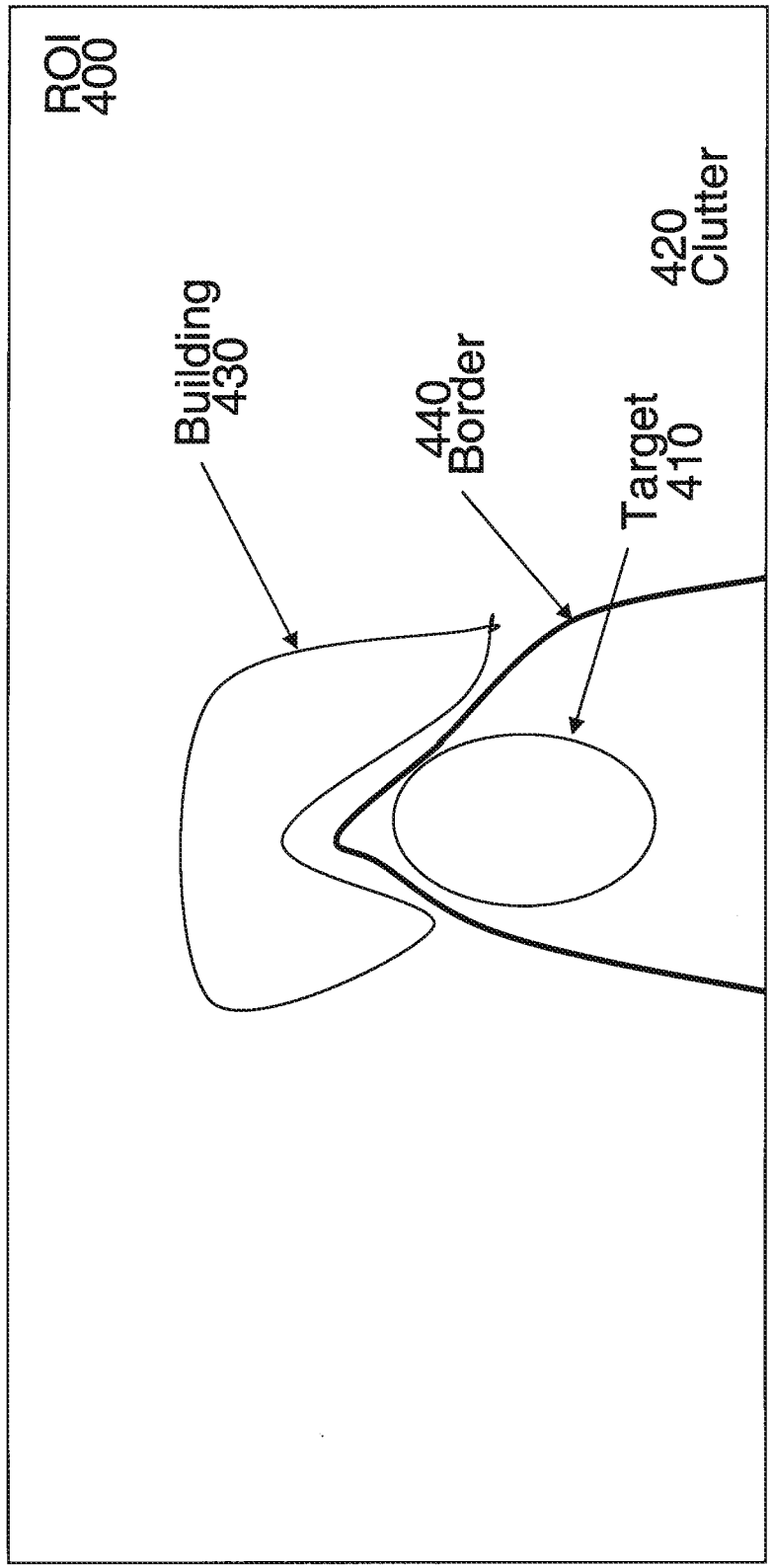
FIG. 4 carries the separation goal of FIGS. 2-3 even further, showing the separation of a target from a nearby building in a chip using a non-linear border.

Finally, in FIG. 4, the chip 400, target 410, and clutter 420 are joined by a building 430, which partially surrounds the target. In this case, a non-linear border 440 separates the target from the building.

Figure 5:
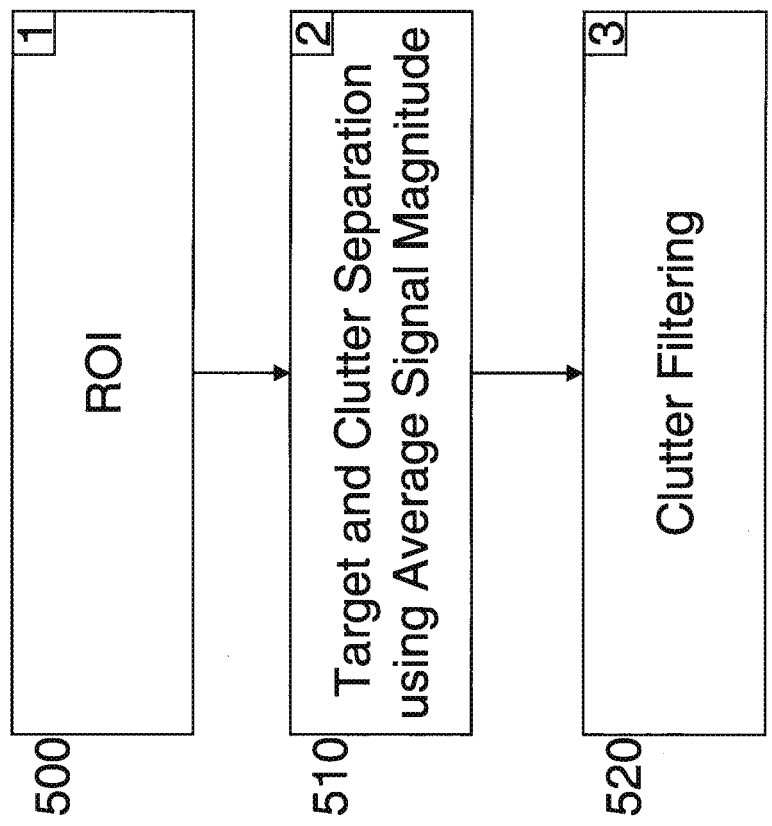
FIG. 5 is a functional block diagram illustrating the first part of Phase 1 of an exemplary embodiment of the invention.
Figure 6:
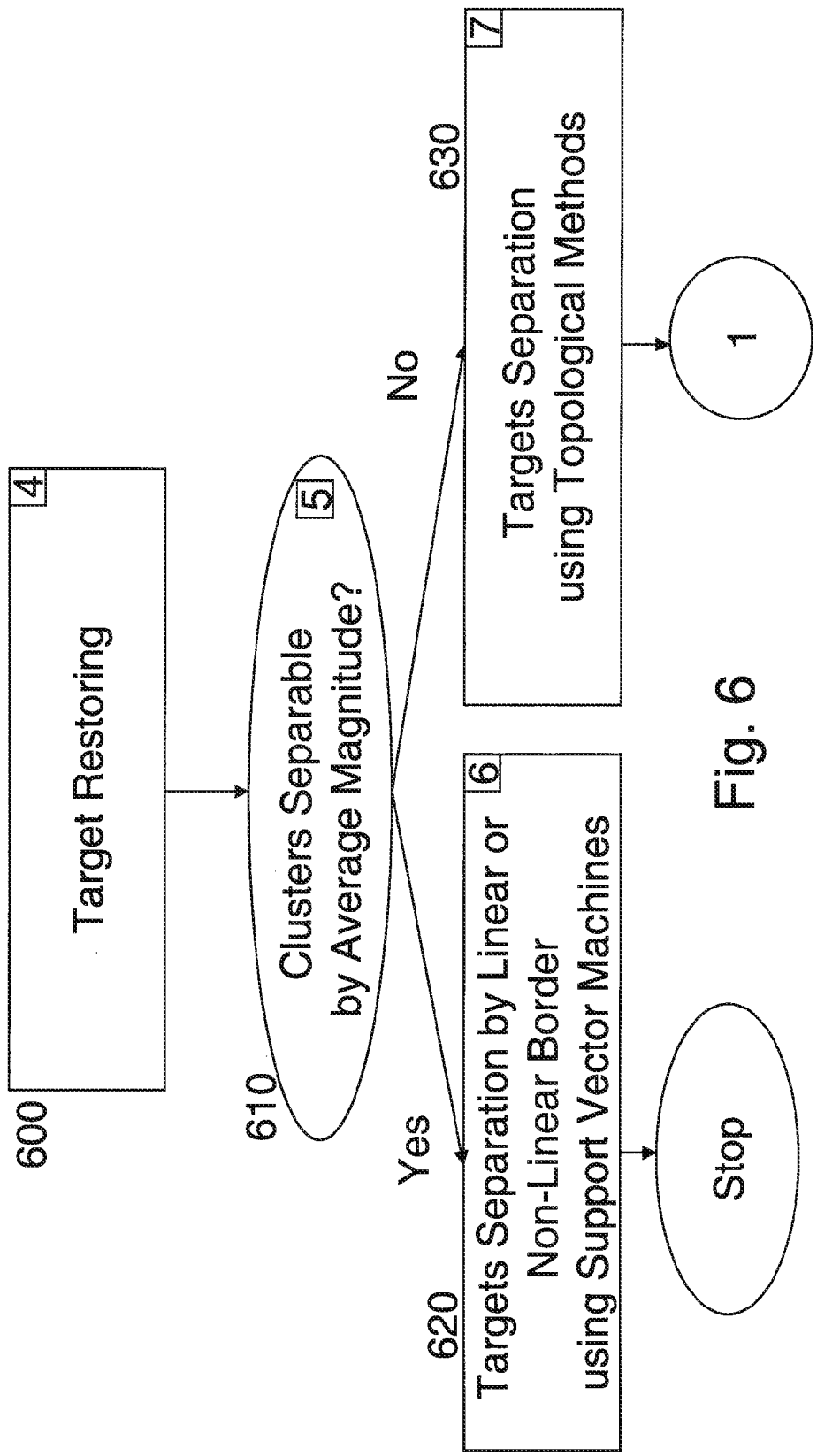
FIG. 6 is a functional block diagram depicting the second part of Phase 1 of an exemplary embodiment of the invention.

The flow of TSA processing is shown in FIGS. 5-8. TSA processing includes two stages:

Stage 1 is optional. It comprises separating target from clutter and shadows using the average signal magnitude of pixels in the cluster (where a cluster is a set of pixels being processed). Referring to FIG. 5, the input to the TSA processing is a chip 500. From this, the system uses average signal magnitude 510 to separate objects and clutter. Next, clutter filtering 520 removes spurious pieces of clutter in the processed image that mistakenly show up as an object. Continuing with FIG. 6, target restoring 600 removes spurious pieces of clutter in the processed image that mistakenly show up within an object. In some cases, average signal magnitude is sufficient 610 to separate these targets and objects, from both themselves and the clutter. If this is the case, the clusters are separable by average signal magnitude (defined below), so apply Support Vector Machines 620 to separate these clusters (targets) by a linear or a nonlinear border. Stage 1 is optional because it is not necessary to separate targets from clutter before separating targets in stage 2, but it can increase the accuracy of separation and create better images of targets for recognition in ATR.

Figure 7:
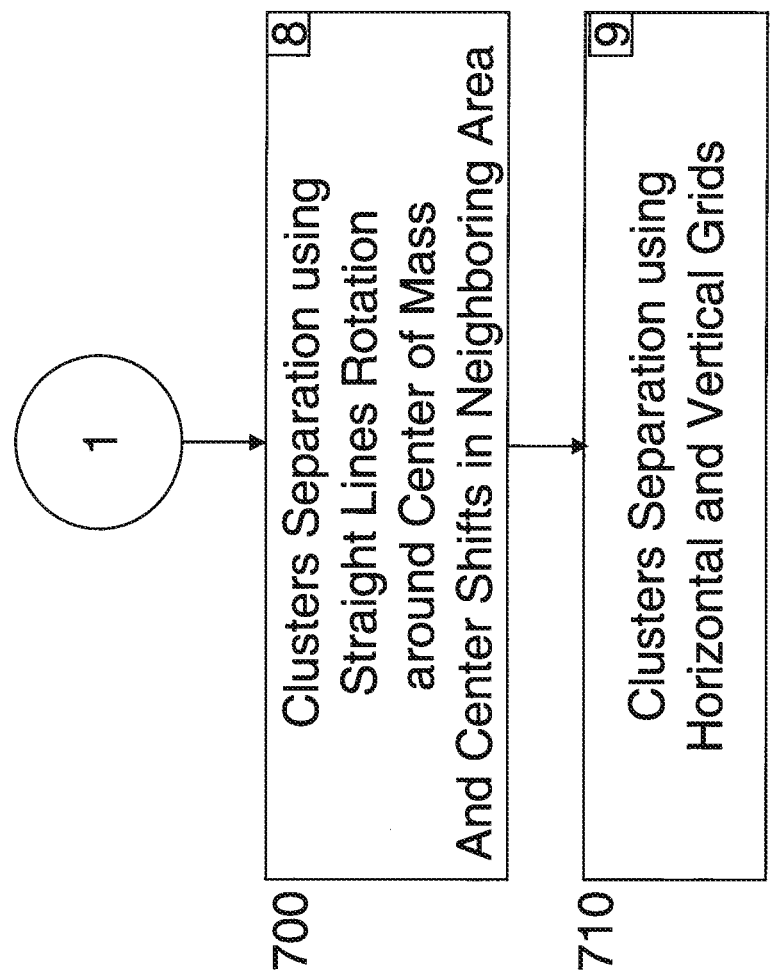
FIG. 7 is a functional block diagram showing Phase 2 of an exemplary embodiment of the invention.
Figure 8:
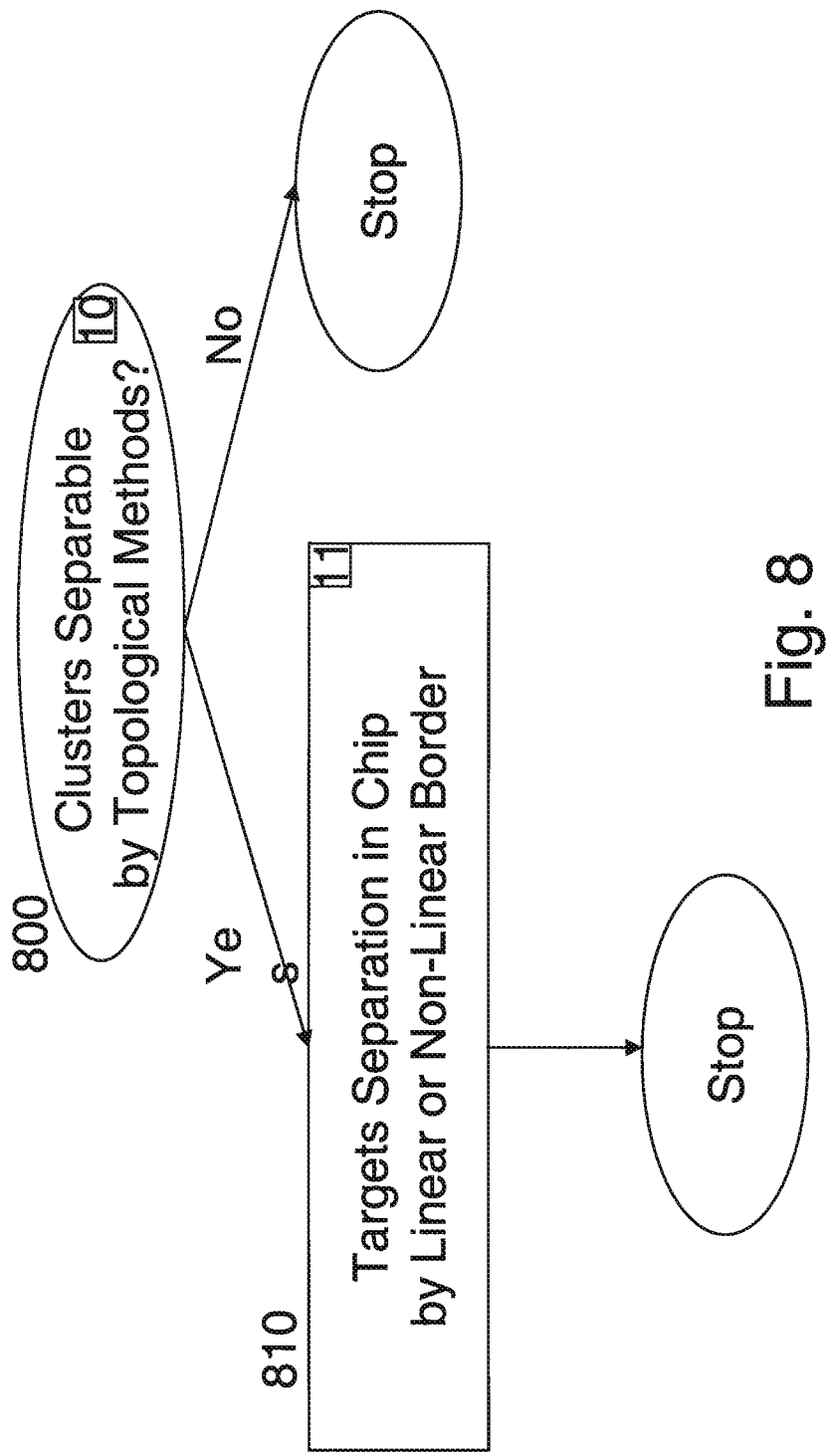
FIG. 8 is a diagram of the last part of Phase 2 of an exemplary embodiment of the invention.

Stage 2 comprises separating two or more targets, or targets and objects, using topological (geometrical) methods. When average signal magnitude is insufficient to separate all the targets from the other objects and the clutter, topological (geometrical) methods 630 are used. Referring to FIG. 7, start first with rotating lines about a center of mass 700, adjusting the axis of rotation outward from the center of mass to find the best such line. Alternatively, or in addition, try separating the clusters using horizontal or vertical grids 710. Finishing with FIG. 8, if the clusters can be separated by topological methods (rotating lines or horizontal or vertical grids) 800, then they are separable by a linear or non-linear border 810 (just like the separation by average signal magnitude case).

TSA Stage 1

Consider a chip (ROI) to be a closed area A in a two-dimensional space. Set S is a set of all points (pixels) in area A. Every point K belonging to area A has coordinates $(x_k, y_k)$ and power (signal magnitude) $P(x_k, y_k)$ Consider any pattern in A, such as a target, an object, clutter, or shadow, to be a cluster C (subset of points in A). Assume that any cluster has its own unique average signal magnitude.

Algorithm 1: Rough Separation of Targets and Objects from Clutter and Shadow

Algorithm 1 is useful when targets and objects have a different average magnitude than clutter and shadow. The following is an exemplary embodiment:

Step 1. Find $$P_{min} = \min_{(x,y) \in A} (P(x, y))$$

and $$P_{max} = \max_{(x,y) \in A} (P(x, y)).$$

Step 2. Divide the interval $[P_{min}, P_{max}]$ into two subintervals, $[P_{min}, P_1]$ and $(P_1, P_{max}]$, where $P_1$ is a parameter—for example, it can be a middle of interval $[P_{min}, P_{max}]$. Define two clusters C and D: $C=\{(x, y):P(x, y) \in [P_{min}, P_1]\}$ and $D=\{(x, y):P(x, y) \in (P_1, P_{max}]\}$.

Step 3. For all $(x, y) \in C$, set $P(x, y)=0$.

Figure 16:
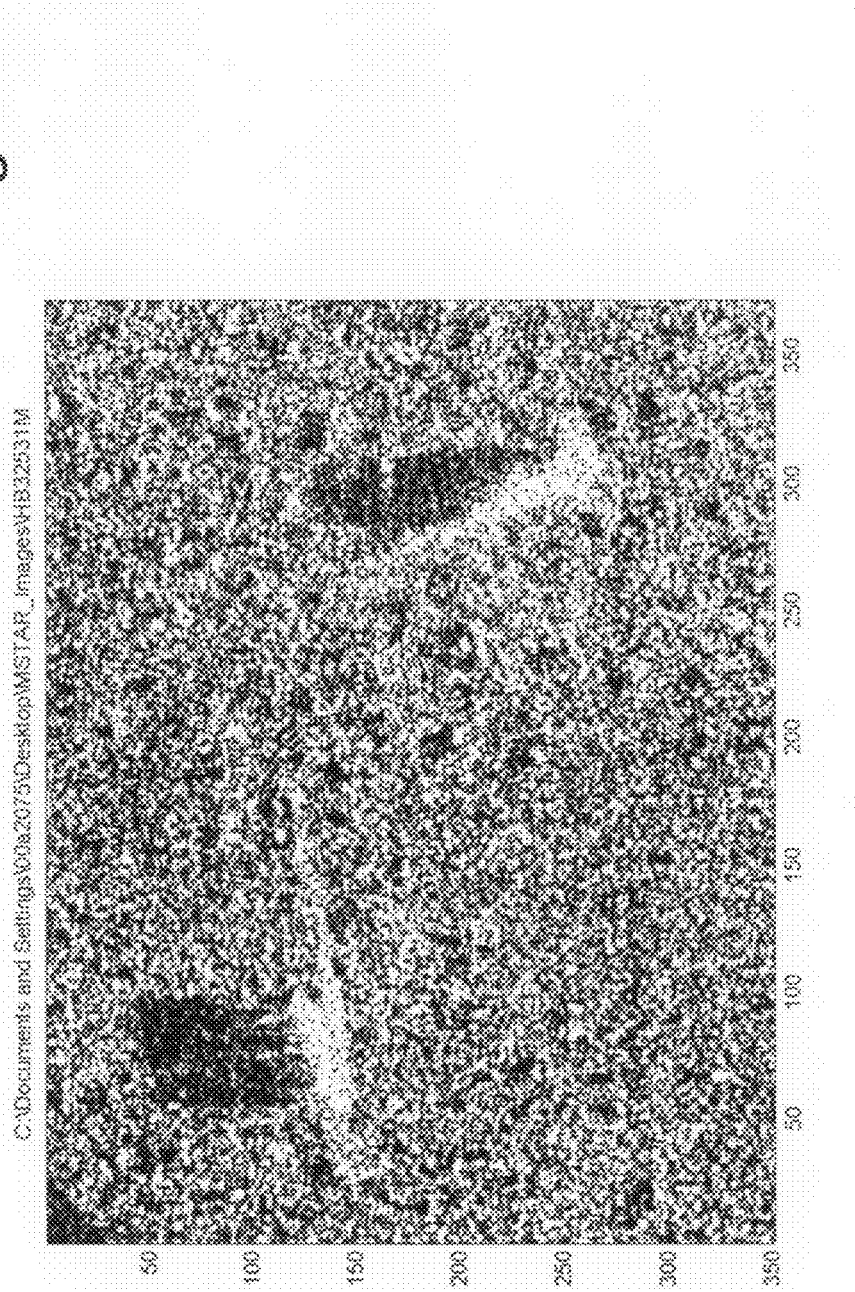
FIG. 16 is an illustration of an example Moving and Stationary Target Acquisition and Recognition (MSTAR) image (bitmap) containing two targets in the ROI.
Figure 17:
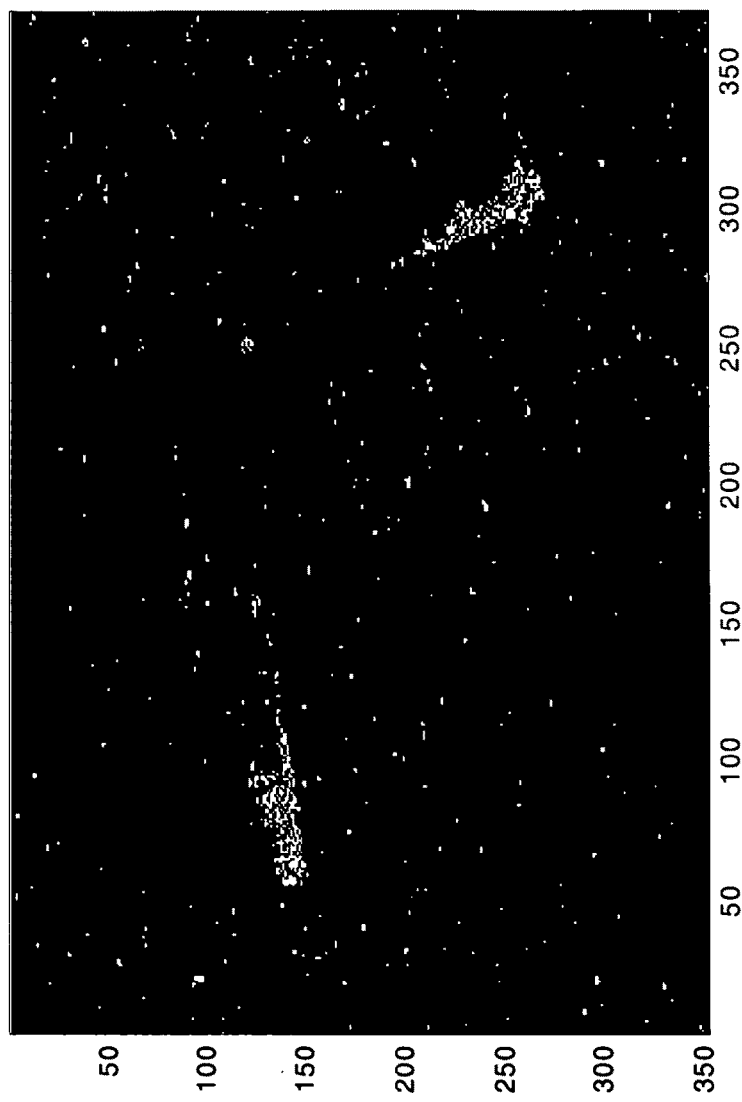
FIG. 17 shows the same image after clutter has been removed using average signal magnitude (Algorithm 1) in an exemplary embodiment of the invention.

Algorithm 1 treats all points from cluster C in area A as possible clutter (or shadow) and deletes them from the chip while treating all points from cluster D as a possible target (or object) and leaves them alone. For an example use of Algorithm 1, see FIGS. 16-17. FIG. 16 shows a Moving and Stationary Target Acquisition and Recognition (MSTAR) image (bitmap) with two closely spaced targets in the ROI. FIG. 17 shows the same image after applying Algorithm 1 (deleting clutter and shadows).

Algorithm 2: Separation of Two Clusters by Signal Magnitude

Figure 9:
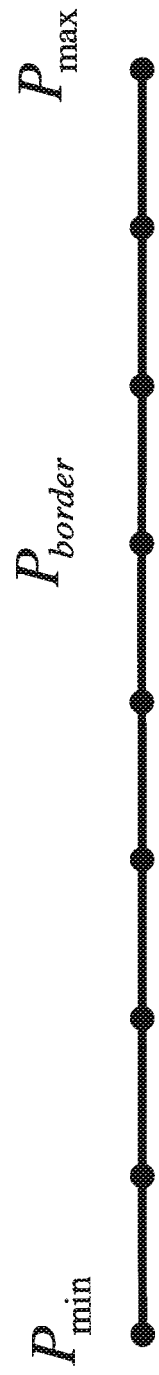
FIG. 9 shows a continuum of signal magnitudes by which targets can be separated using an embodiment of the invention (Algorithm 1).

Algorithm 2 can be used to separate two clusters (e.g., target and clutter, target and target) in the ROI that have different average magnitude. Though this algorithm is more complicated than Algorithm 1, it is generally more accurate. Algorithm 2 uses an iterative procedure to compute the maximum variation $\Delta P$ on the interval $[P_{min}, P_{max}]$. See FIG. 9. For some cases, Algorithm 2 can separate two targets in the ROI by using average cluster magnitude (when the average signal magnitudes for the two targets in the chip are different). Here is an example embodiment:

Step 1. Find $$P_{min} = \min_{(x,y) \in A} (P(x, y))$$

and $$P_{max} = \max_{(x,y) \in A} (P(x, y)).$$

Step 2. Let n represent the number of subintervals. Start with n=2.

Step 3. Divide the interval $[P_{min}, P_{max}]$ into n equal parts: $[P_{min}, P_1^n], (P_1^n, P_2^n], \ldots, (P_{n-1}^n, P_{max}]$.

Step 4. For j=1, 2, ..., n−1, do the following:
1. Divide set S into two subsets, $C_j^n$ and $D_j^n$, as follows:

$$C_j^n = \{(x,y): P_{min} \leq P(x,y) \leq P_j^n\} \text{ and } D_j^n = \{(x,y): P_j^n < P(x,y) \leq P_{max}\}.$$

If the number of pixels in either $C_j^n$ or $D_j^n$ falls below $N_{min}$, the minimum cluster size, then skip the calculations in the next two substeps for this j and set a threshold $\Delta P_j^n = 0$.

2. Calculate $\overline{P_j^n}$=the average P(x, y) for set $C_j^n$ and $\overline{Q_j^n}$=the average P(x, y) for set $D_j^n$.

3. Calculate the threshold $\Delta P_j^n = \overline{Q_j^n} - \overline{P_j^n}$. If $\Delta P_j^n < t_{min}$, where $t_{min}$ is the tolerance used to decide if clusters are separable, then set a threshold $\Delta P_j^n = 0$.

Step 5. Calculate the maximum threshold $$\Delta P_{max}^n = \max_{1 \leq j < n} (\Delta P_j^n)$$

and a maximum threshold index $k_n$, where $\Delta P_{k_n}^n = \Delta P_{max}^n$. See FIG. 9.

Step 6. Increase the number of subintervals: n=n+1. Return to Step 3.

Repeat steps 3-6 until the value $\Delta P_{max}^n$ no longer increases significantly with increasing index n, that is, until $\Delta P_{max}^{n+1} - \Delta P_{max}^n < t_{max}$, where $t_{max}$ is the tolerance used to control the iterative calculation of $\Delta P_{max}^n$. Value $\Delta P_{k_n}^n \in ([P_{min}, P_{max}]$ on the last iteration (steps 3-6) is the best separation border point, with maximum threshold $\Delta P_{max}^n$, which separates set S into two clusters (objects), $C_{k_n}^n$ and $D_{k_n}^n$. Note that if $\Delta P_{max}^n = 0$ on the last iteration, then the clusters $C_{k_n}^n$ and $D_{k_n}^n$ are not separable by signal magnitude P in area A. That is, Algorithm 2 can only discern one target in A in such a case.

Algorithm 3: Separation of r Clusters by Signal Magnitude

Algorithm 3 can separate r clusters (representing several targets) in the ROI, provided the average signal magnitudes for the r targets in the chip are different. This is a generalization of the approach used for two-object separation in Algorithm 2. In particular, this algorithm does a separation of S into r clusters $C_1, C_2, \ldots, C_r$ in area A. Here is a sample approach:

Step 1. Find $$P_{min} = \min_{(x,y) \in A} (P(x, y))$$

and $$P_{max} = \max_{(x,y) \in A} (P(x, y)).$$

Step 2. Let n represent the number of subintervals. Start with n=r.

Step 3. Divide the interval $[P_{min}, P_{max}]$ into n equal parts: $[P_{min}, P_1^n], (P_1^n, P_2^n], \ldots, (P_{n-1}^n, P_{max}]$.

Step 4. Choose r−1 values $Q_1, Q_2, \ldots, Q_{r-1}$ from $\{P_1^n, P_2^n, \ldots, P_{n-1}^n\}$ and divide the interval $[P_{min}, P_{max}]$ into r subintervals $[P_{min}, Q_1], (Q_1, Q_2], \ldots, (Q_{r-1}, P_{max}]$. There are $$\binom{n-1}{r-1}$$

ways to choose such values; index these combinations $$1, 2, \ldots, \binom{n-1}{r-1}.$$

For $$j = 1, 2, \ldots, \binom{n-1}{r-1},$$

take the corresponding combination of values $Q_1^j, Q_2^j, \ldots, Q_{r-1}^j$ and perform the following:

1. Divide set S into r subsets $S_1^j, S_2^j, \ldots, S_r^j$ as follows:

$$S_1^j = \{(x, y): P_{min} \leq P(x, y) \leq Q_1^j\},$$

$$S_2^j = \{(x, y): Q_1^j < P(x, y) \leq Q_2^j\},$$

$$\vdots$$

$$S_r^j = \{(x, y): Q_{r-1}^j < P(x, y) \leq P_{max}\}.$$

If the number of pixels in any of $S_1^j, S_2^j, \ldots, S_r^j$ falls below $N_{min}$, the minimum cluster size, then skip the calculations in the next three substeps for this combination and set a combination threshold $\Delta P^j = 0$.

2. Calculate $\overline{P_1^j}$=the average P(x, y) for set $S_1^j$, $\overline{P_2^j}$=the average P(x, y) for set $S_2^j, \ldots, \overline{P_r^j}$=the average P(x, y) for set $S_r^j$.

3. Calculate the individual thresholds $\Delta P_1^j = \overline{P_2^j} - \overline{P_1^j}$, $\Delta P_2^j = \overline{P_3^j} - \overline{P_2^j}, \ldots, \Delta P_{r-1}^j = \overline{P_r^j} - \overline{P_{r-1}^j}$. If any of these thresholds are less than to $t_{min}$, where $t_{min}$ is the tolerance used to decide if clusters are separable, then skip the calculation in the last substep and set a combination threshold $\Delta P^j = 0$.

4. Calculate the combination threshold $$\Delta P^j = \min_{1 \leq i < r}(\Delta P_i^j).$$

Step 5. Calculate the maximum threshold $$\Delta P_{max}^n = \max_{1 \leq j \leq \binom{n-1}{r-1}}(\Delta P^j)$$

a maximum threshold index $k_n$, where $\Delta P^{k_n} = \Delta P_{max}^n$.

Step 6. Increase the number of subintervals: n=n+1. Return to Step 3.

Repeat steps 3-6 until the value $\Delta P_{max}^n$ no longer increases significantly with increasing index n, that is, until $\Delta P_{max}^{n+1} - \Delta P_{max}^n < t_{max}$, where $t_{max}$ is the tolerance used to control the iterative calculation of $\Delta P_{max}^n$. Values $Q_1^{k_n}, Q_2^{k_n}, \ldots, Q_{r-1}^{k_n} \in (P_{min}, P_{max})$ on the last iteration (steps 3-6) are the best separation border points, with maximum threshold $\Delta P_{max}^n$, which separates set S into r objects $S_1^{k_n}, S_2^{k_n}, \ldots, S_r^{k_n}$.

Algorithm 3A (Clutter Filtering)

After separating targets from clutter using Algorithm 1, 2, or 3 and deleting clutter from A (i.e., setting P(x, y)=0 for all clutter points (x, y), see step 3 of Algorithm 1), Clutter Filtering can "clean" area A. This procedure deletes single or small groups of separated pixels of clutter in A which were not deleted by clutter separation in Algorithm 1, 2, or 3.

Figure 10:
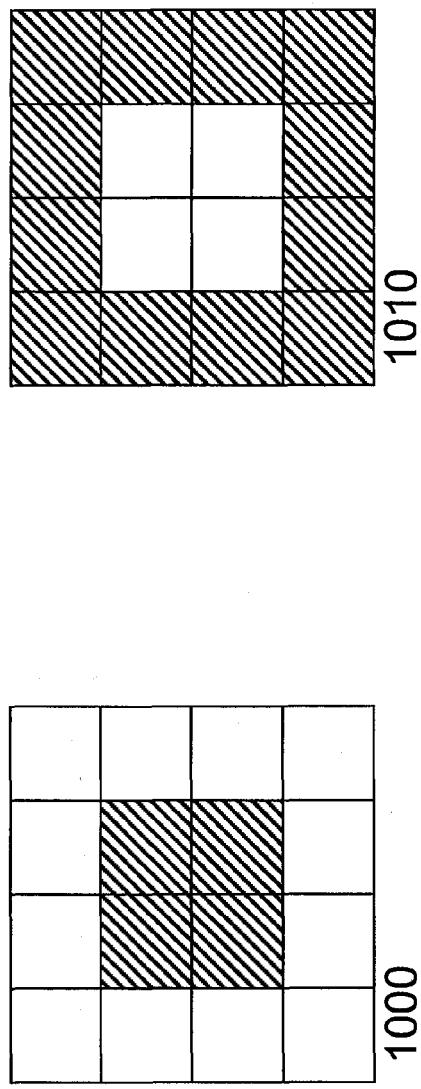
FIG. 10 shows the pixel windows used by the clutter filtering and target restoring algorithms in an example of the invention.

Referring to FIG. 10, create a 1010 mask window M (the shaded portion), and move this window across area A (across all columns and rows of pixels in A). The size of window M is a parameter of the Clutter Filtering algorithm. As soon as the partial image $A_p$ (under M) in area A is identical to mask window M (that is, the portion under the shaded area is all clutter), delete the pixels from the central part (unmasked portion) of $A_p$.

For an example of Clutter Filtering, consider 1010, a 16-pixel clutter filtering mask window M, where the mask consists of the 12 pixels on the outside edge. The four central (unmasked) pixels in the window can represent "target" (i.e., P(x, y)>0) or "clutter" (where P(x, y)=0); all other pixels in M must be clutter to activate clutter filtering. Consider the MSTAR image of a ROI after clutter separation (using Algorithm 1, see FIG. 17). Each time when the central part of area $A_p$ under window M has four or fewer "target" pixels, delete these pixels (i.e., set P(x, y)=0). The results of Clutter Filtering are shown on FIG. 17 (before filtering) and FIG. 18 (after filtering).

Algorithm 3B (Target Restoring)

This procedure is the opposite of Clutter Filtering, namely restoring target pixels that were either missing or inadvertently deleted from A by using Algorithm 1, 2, or 3, or by Clutter Filtering. Referring to FIG. 10, target restoring consists of first creating a 1000 mask window R (the unshaded portion) and moving this window across area A. As soon as the partial image $A_p$ (under R) in area A is identical to mask window R (that is, the portion under the unshaded area is all target), restore all pixels in the central part of $A_p$ (e.g., for each such central pixel (x, y), set P(x, y) to some suitable nonzero value, say $P_{max}$).

Figure 18:
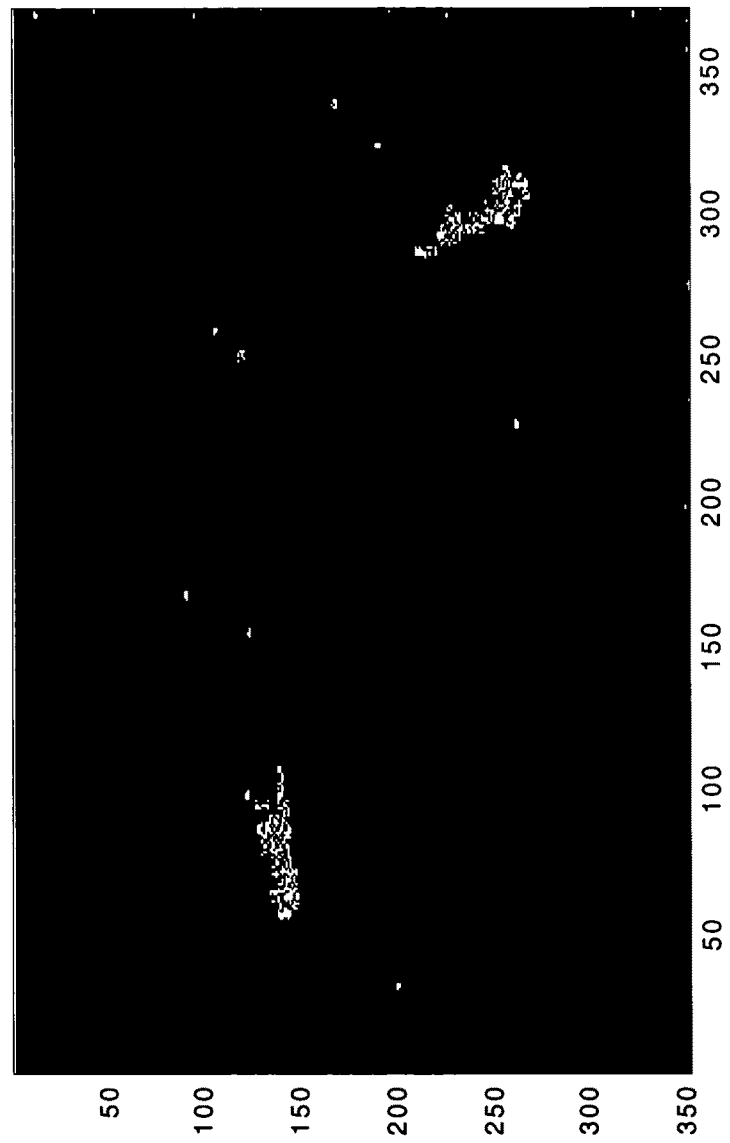
FIG. 18 shows the next step of processing the same image, namely clutter filtering (Algorithm 3A) in an exemplary embodiment of the invention.
Figure 19:
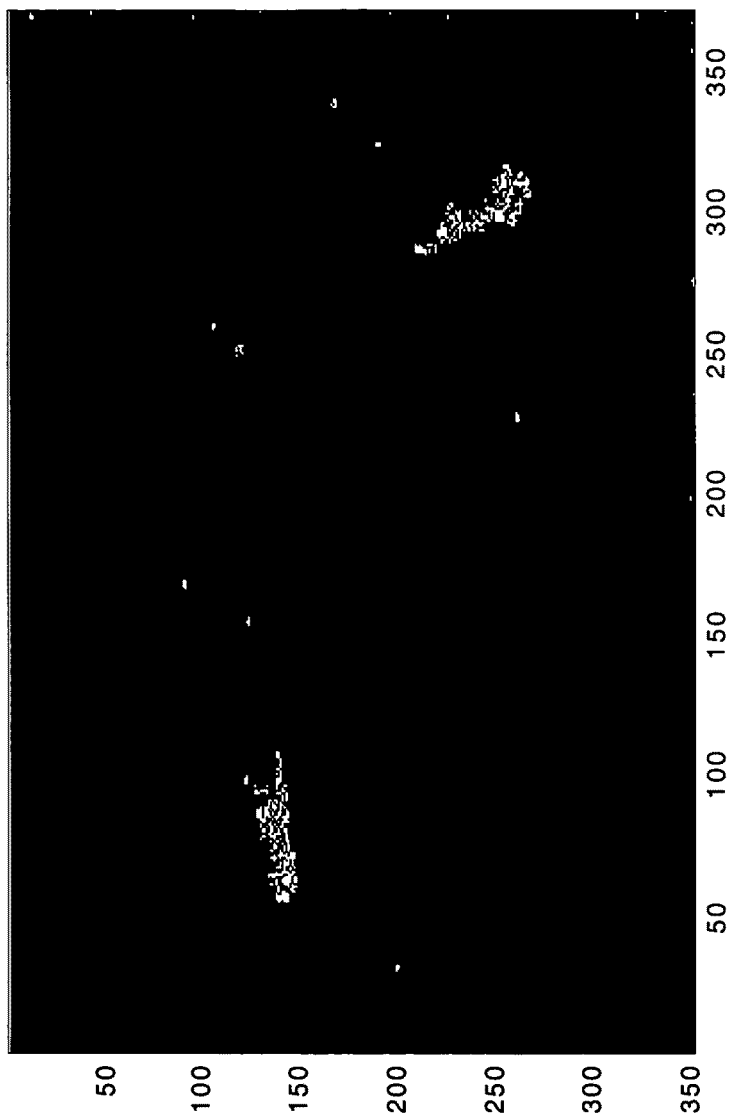
FIG. 19 shows the next step of processing the same image, namely target restoring (Algorithm 3B) in an exemplary embodiment of the invention.

As an example of Target Restoring, FIG. 18 shows an MSTAR image of the ROI after Clutter Filtering and before Target Restoring. FIG. 19 shows the same image after Target Restoring using the 16-pixel mask window R (see 1000 in FIG. 10).

Algorithm 4: Target Separation Using Support Vector Machines

Figure 11:
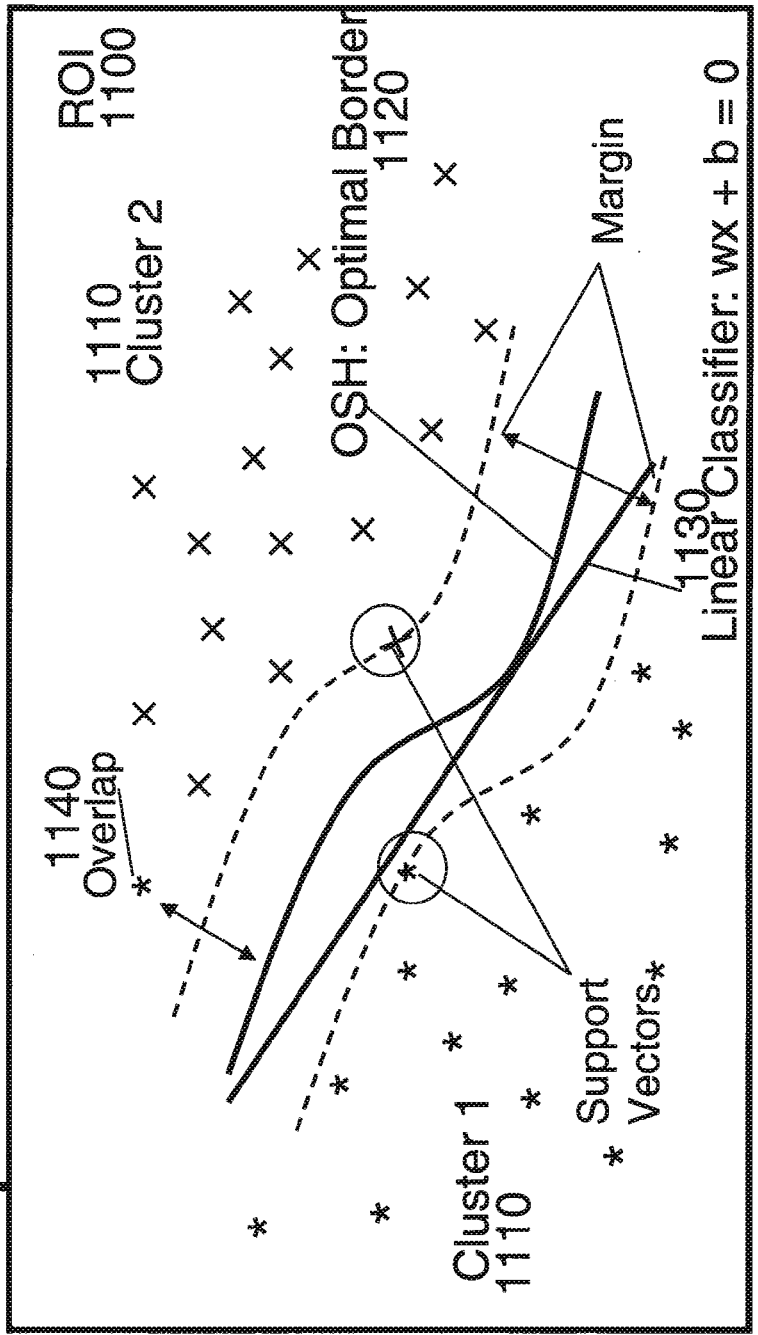
FIG. 11 depicts the support vector machines approach (Algorithm 4) used to do a separation of linearly separable clusters (targets) in an exemplary embodiment of the invention.
Figure 12:
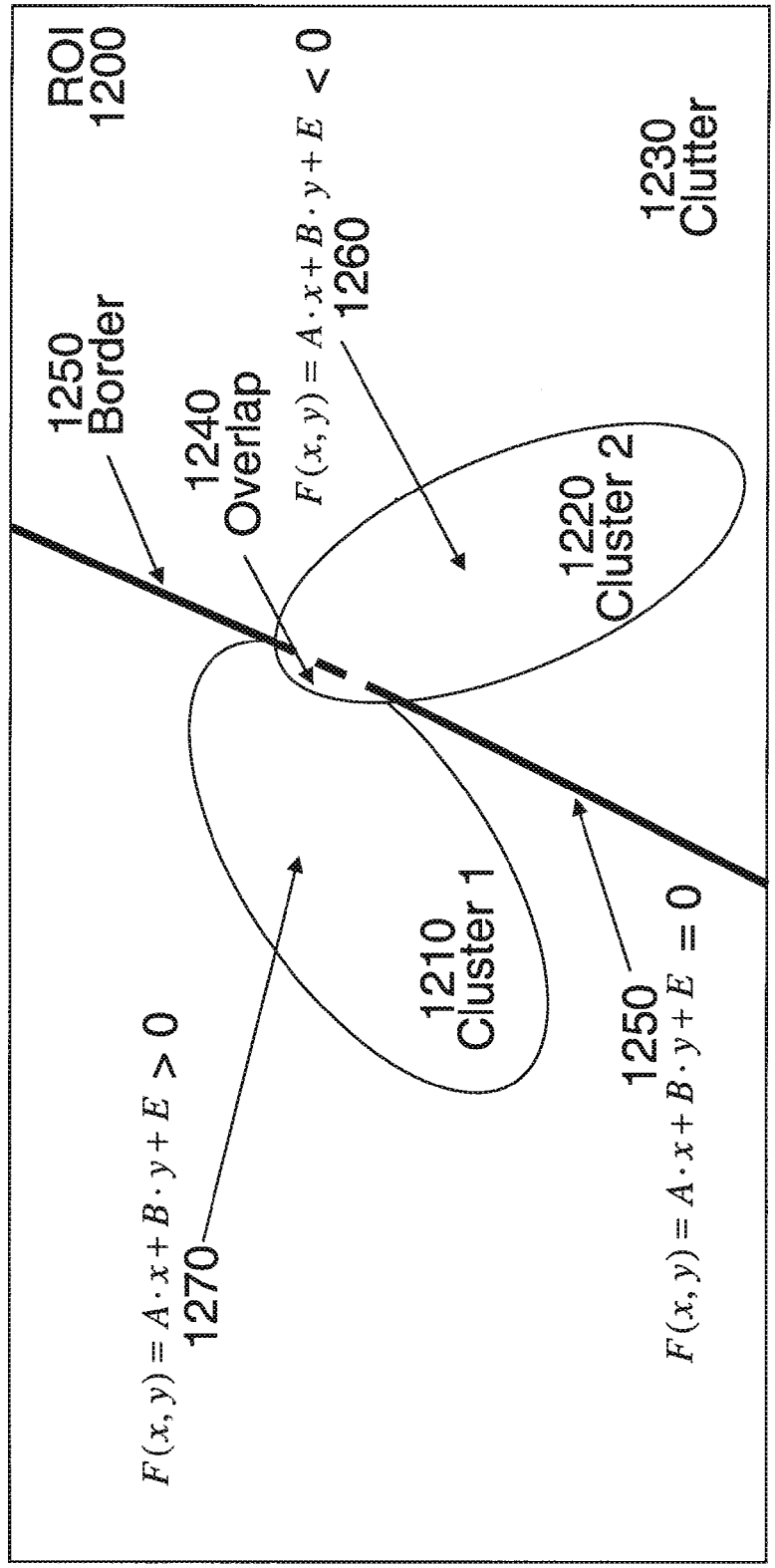
FIG. 12 illustrates the use of a line (expressed in linear form) to separate two overlapping clusters using a linear border.

After applying Algorithm 2 or 3, there may be two or more clusters with different average signal magnitudes. Assume these average signal magnitudes are also different from the average clutter magnitude. In this case, Support Vector Machines (SVM) can separate these clusters (see FIG. 11) by calculating the optimal linear or nonlinear border between the clusters (targets). For a good description of SVM, see Chapter 5, Vladimir N. Vapnik, The Nature of Statistical Learning Theory, (2nd ed., Springer 1999), the contents of which is herein incorporated by reference. Before describing SVM, a definition of separable clusters and overlaps is in order:

Separation of Two Clusters with Overlaps by Linear Function (See FIG. 12)

Suppose we have a chip 1200 with two clusters, $C_1$ 1210 and $C_2$ 1220, along with linear function y=Ax+B (assume the rest of the chip is clutter 1230). Transform the linear function y=Ax+B to a linear form: $F(x, y) = A_1 x + B_1 y + E_1$, where $A_1 = A$, $B_1 = -1$, and $E_1 = B$. Then clusters $C_1$ and $C_2$ are said to be separated by 1250 linear function (border) y=Ax+B (that is, $C_1$ and $C_2$ are linearly separable) if either:

$$F(x,y) > 0 \text{ for all}(x,y) \in C_1 \text{ and } F(x,y) < 0 \text{ for all}(x,y) \in C_2, \text{ or} \quad (1)$$

$$F(x,y) < 0 \text{ for all}(x,y) \in C_1 \text{ and } F(x,y) > 0 \text{ for all}(x,y) \in C_2. \quad (2)$$

If instead, in case (1) for some point $(x_n, y_n)$ from cluster $C_1$, $F(x_n, y_n) = d_n < 0$ (i.e., region 1260), then we define this point to be an overlap and the value $|d_n|$ as the overlap distance (i.e., distance from point $(x_n, y_n)$ to 1250 border F(x, y)=0). Likewise for case (1) for some point $(x_m, y_m)$ from cluster $C_2$, $F(x_n, y_n) = d_m > 0$ (region 1270), then we define this point to also be an overlap and the value $|d_m|$ as the overlap distance. For example, the overlap region 1240 has just such points from $C_2$. Similar definitions for overlap extend to case (2).

We describe the idea of SVM for a simple case (linearly separable clusters). See FIG. 11. Suppose we have two non-overlapping clusters (targets) 1110 in a two-dimensional Euclidian space 1100 and we have to separate these two clusters using an optimal straight line 1130. In general, this is called the optimal separating hyperplane (OSH). By optimal separation, we mean a line that separates the two clusters onto different sides of the line and that equalizes the minimum distance from these clusters to the line. The minimum distance from a cluster to the OSH is a minimum of Euclidian distances (normal vectors) from every point in the cluster to the OSH. Therefore, optimization of cluster separation means that we have to find the largest empty margin between the two clusters and in the middle of this margin, we draw a straight-line border 1130, i.e., the OSH. More generally, separable clusters in SVM can have overlaps 1140 and the OSH can be a nonlinear curve 1120 (or surface in 3-D space).

For two separated clusters (Algorithm 2), we calculate one border using SVM, which separates two closely spaced targets in a chip. In the case of r clusters (Algorithm 3), we calculate borders between every pair of clusters and then unify all borders that belong to one cluster into one unified border surrounding this cluster. In this case, we separate r targets in a chip using SVM.

As mentioned before, the borders can be described by a linear function (straight lines) or nonlinear functions (usually polynomial curves). In general, linear functions minimize computations while nonlinear functions maximize accuracy.

Clusters can overlap each other. This means that after separating clusters and performing border computations, some points (pixels) of a cluster can be on the opposite side of the border and belong to another cluster. If the number of these points is too large (more than a certain percentage of all points in the cluster) or the overlaps (distances from these points to the OSH) are more than the maximum tolerance, then we declare that these clusters (objects) are not separable.

TSA Stage 2

In stage 2, we use topological methods to separate targets in a chip. These methods are based not on average cluster magnitude but on geometrical locations of clusters in the ROI. If after stage 1 the targets are not separable by signal magnitude, then there is only one cluster C of targets (objects) and all other pixels in the ROI are deleted (clutter). If we did not apply stage 1, then we use the initial image in the ROI as a cluster C for separation. We suppose that cluster C contain two (or more) sub-clusters $C_1$, and $C_2$ (two targets or objects) for separation.

Algorithm 5: Target Separation Using Rotating Lines and Center Shifts

Figure 13:
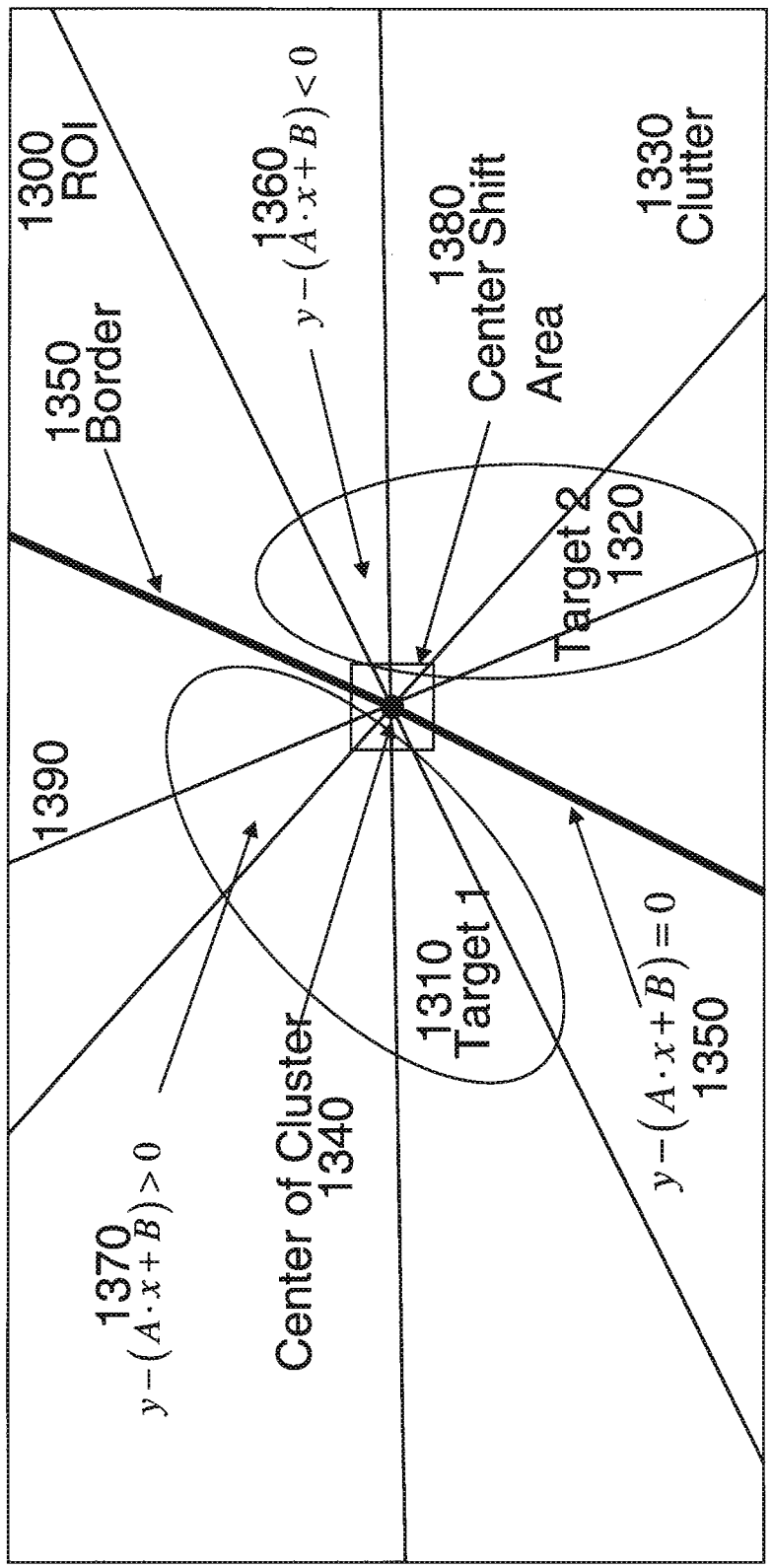
FIG. 13 shows the separation of two targets by linear border using the rotating lines (topological) method (Algorithm 5).
Figure 14:
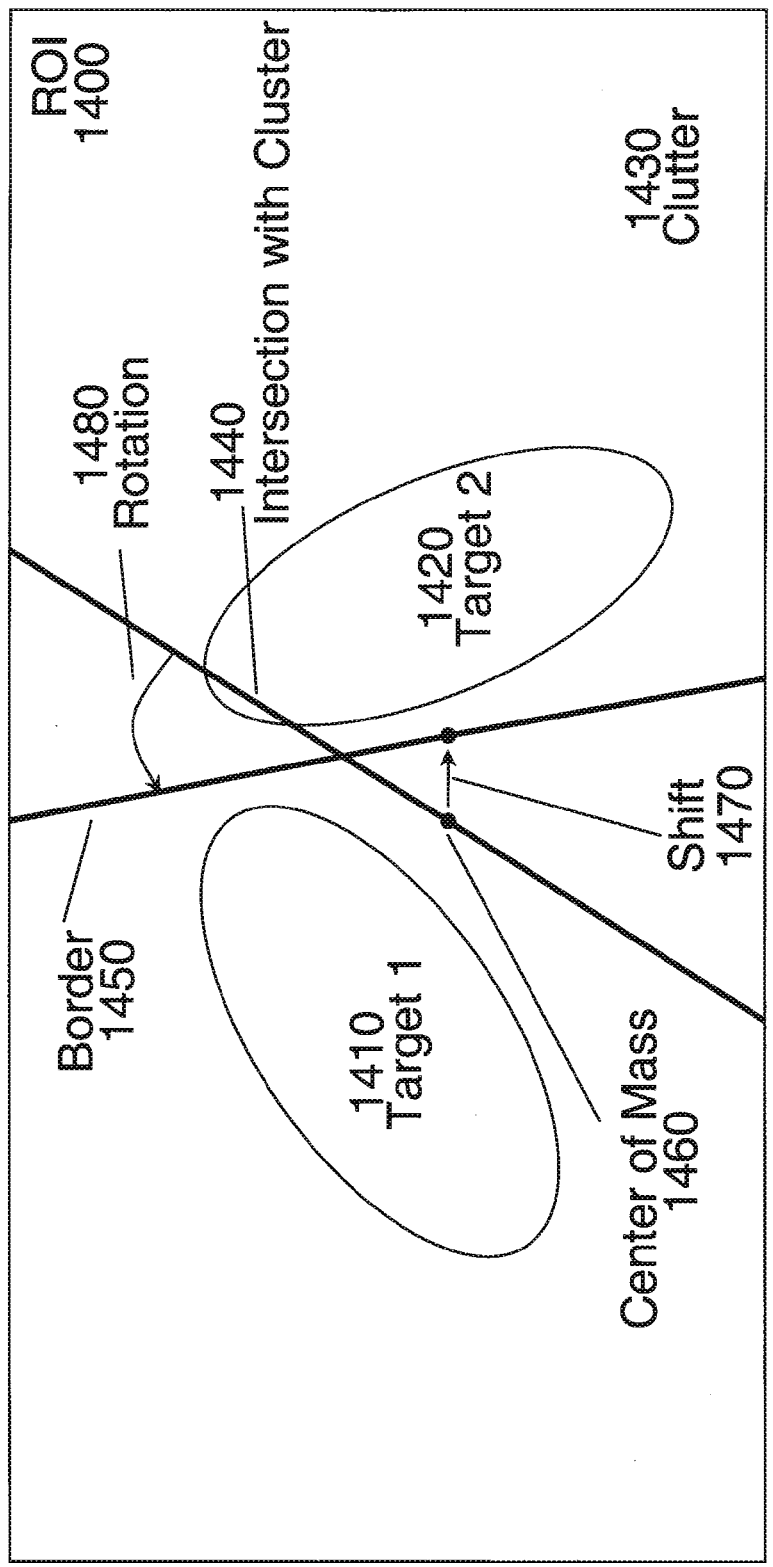
FIG. 14 shows the rotating lines method using a shift of the center of mass to find a more appropriate rotation point for the lines, which leads to better target separation in an exemplary embodiment of the invention.

Algorithm 5 is a topological method of separating targets (see FIGS. 13-14). For FIG. 13, suppose we have a chip 1300, a cluster consisting of two targets 1310 and 1320, and some clutter 1330. Rotating lines involves finding a center of mass 1340 of the cluster and doing a line rotation about the center of mass 1340. See, for example, lines 1350 and 1390. The idea is that when the line intersects the cluster, like with line 1390, it is not a good choice for separating the targets. The line is rotated until a better separation is achieved, like what happens with line 1350, which does a linear separation of targets 1310 and 1320 by line y=A·x+B, with line 1350 corresponding to points that satisfy y−(A·x+B)=0, target 1310 falling on the side 1370 of the line, corresponding to y−(A·x+B)>0, and target 1320 falling on the other side 1360 of the line, corresponding to y−(A·x+B)<0. Should the center of mass 1340 not be suitable, it may be desirable to do a shift of the rotation point to a different location within a center shift area 1380 about the center of mass 1340, as discussed below and in FIG. 14.

For FIG. 14, suppose we have a chip 1400, with two clusters 1410 and 1420, along with some clutter 1430, a center of mass 1460 of the two clusters, and a line rotation 1480 about the center of mass. When the line forms an intersection 1440 with a cluster, it is not a good choice for separating the clusters. As mentioned above, it may be desirable to do a shift 1470 in the center of mass to some other nearby point in order to find a better rotation position. The goal is to find a border 1450 that cleanly separates the two clusters. Here is an exemplary embodiment:

Step 1. Calculate coordinates of the center of mass $(x_c, y_c)$ for cluster C:

$$x_c = \frac{\sum_{k=1}^{m} x_k P(x_k, y_k)}{\sum_{k=1}^{m} P(x_k, y_k)}$$

and $$y_c = \frac{\sum_{k=1}^{m} y_k P(x_k, y_k)}{\sum_{k=1}^{m} P(x_k, y_k)}.$$

where m is the number of points in cluster C, $x_k$ and $y_k$ are the coordinates of a point (pixel) K belonging to cluster C, and $P(x_k, y_k)$ is the magnitude of the signal at point K. Initialize center of border rotation $(x_r, y_r)=(x_c, y_c)$.

Step 2. Initialize border rotation angle $\alpha=0$ and rotation index i=0.

Step 3. Calculate the initial linear border between clusters $C_1$ and $C_2$. This is a horizontal straight line $L_0$: $y=y_c$.

Step 4. Calculate the number of pixels $N_0$ intersected by line $L_0$ in cluster C.

Step 5. i=i+1 and $\alpha=\alpha+\Delta\alpha$, where $\Delta\alpha=\pi/n$ is a step of angle rotation of line $L_0$ and n (a parameter of the algorithm) is the number of steps by which to increment $\alpha$, with $0 \leq \alpha < \pi$.

Step 6. Rotate line $L_0$ on angle $\alpha$ counterclockwise around point $(x_r, y_r)$. This is line $L_i$: y=Ax+B, where A=tan $\alpha$ (if $\alpha=\pi/2$, then $L_i$ is the line $x=x_c$) and $B=y_r-Ax_r$.

Step 7. Calculate the number of pixels $N_i$ intersected by line $L_i$ in cluster C. Continue steps 5-7 while $\alpha<\pi$.

Step 8. Calculate the optimal separated linear border $L_{min}$ that intersects the minimum number of pixels in cluster C:

$$N_{min} = \min_{0 \leq i < n} (N_i).$$

Step 9. Repeat steps 2-8 on each of the possible centers of rotation $(x_r, y_r)$ in a predefined area $A_c$ about $(x_c, y_c)$, where $x_r$ is within a predetermined quantity $\Delta x$ of $x_c$ and $y_r$ is within a predetermined quantity $\Delta y$ of $y_c$.

Step 10. Calculate the optimal separated linear border L that intersects the minimum number of pixels $$N = \min_{(x_r, y_r) \in A_c} (N_{min}).$$

This produces the best-separated linear border between clusters $C_1$ and $C_2$.

If the number N is less than some prespecified tolerance T (a parameter of the algorithm) and the number of pixels in clusters $C_1$ and $C_2$ are roughly comparable, then L is a linear border between the two clusters and it separates two targets in the chip. Note that we use the definition of separable clusters (see above) for calculating the number of pixels in $C_1$ and $C_2$ separated by linear form F(x, y).

Note also that step 9 of Algorithm 5 is optional. It increases the possibility of finding the best position for a separated linear border. Computation time can be saved by using just one rotation of straight lines around the center of mass (steps 2-8). See FIG. 13 for an example of rotating lines without shifting the center of mass.

Figure 20:
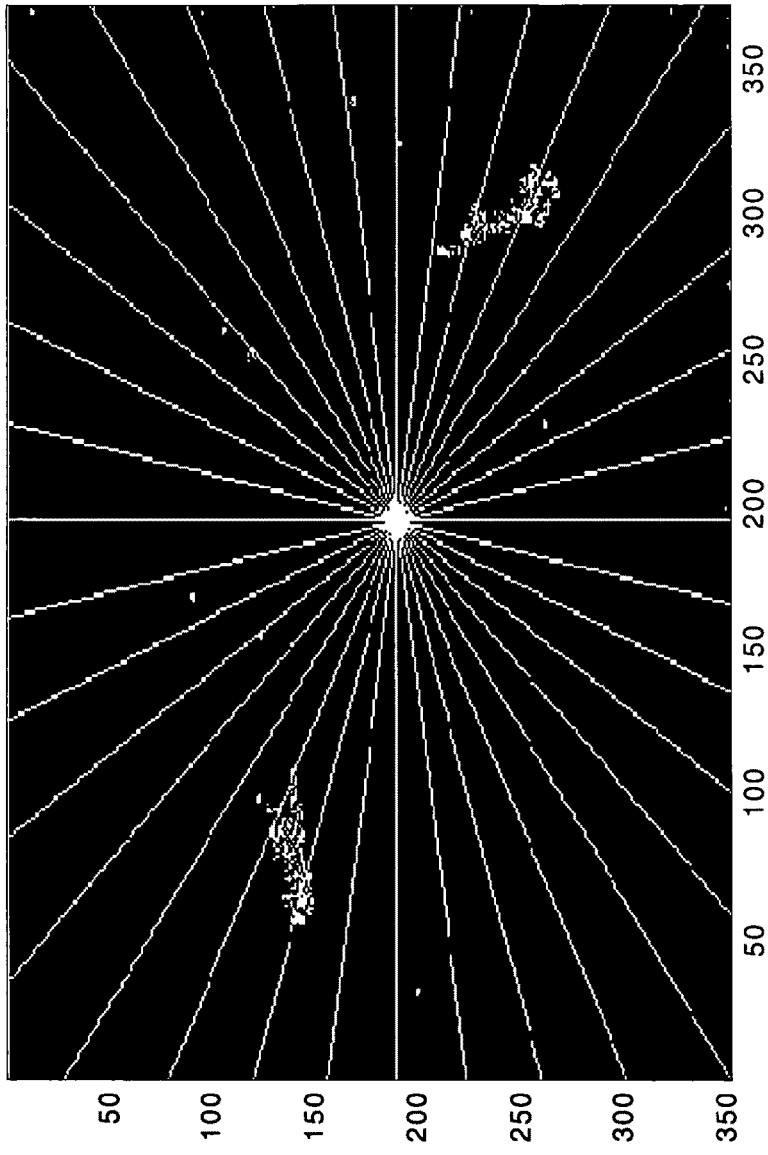
FIG. 20 depicts the rotating lines algorithm (Algorithm 5) as the next step of processing the same image in an exemplary embodiment of the invention.
Figure 21:
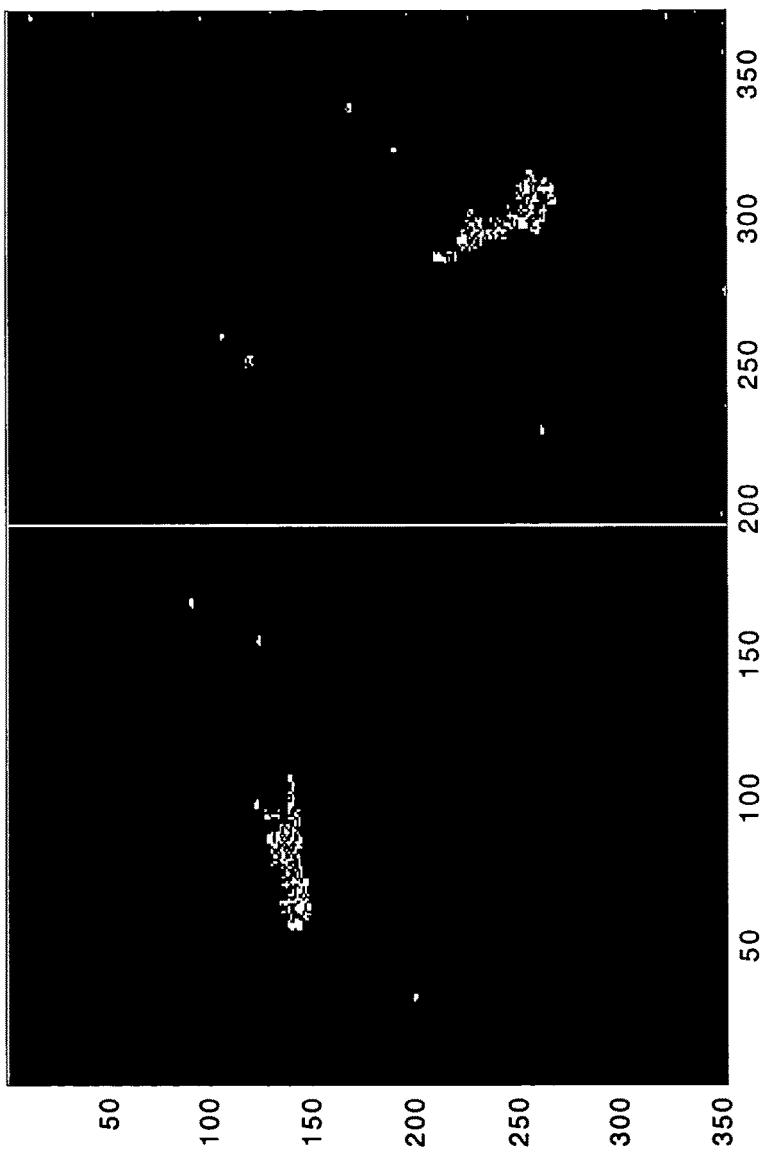
FIG. 21 shows the best of the separating lines from the rotating lines approach in processing the same image in an exemplary embodiment of the invention.

FIGS. 20-21 show the results of Algorithm 5 (after Algorithm 1, Clutter Filtering and Target Restoring were applied to the MSTAR image with two targets (FIG. 16)). The targets are separated by an optimal linear vertical border (FIG. 21), which was defined using rotating lines around the center of mass (steps 2-8). In this case, the number of intersections with the target clusters N=0. The result of target separation in the ROI using Algorithm 5 is shown on FIG. 26.

Separating targets in a chip using rotating lines in Algorithm 5 is not always efficient. For instance, the two targets may have a large overlap, or they may be so closely spaced that a straight line rotating around the center of mass does not properly separate them. In these cases, Algorithm 5 can be augmented or supplanted with Algorithm 6, which uses horizontal and vertical topological grids. Algorithm 6 can be used only after target and clutter separation (stage 1).

Algorithm 6: Target Separation Using Horizontal and Vertical Grids

Figure 15:
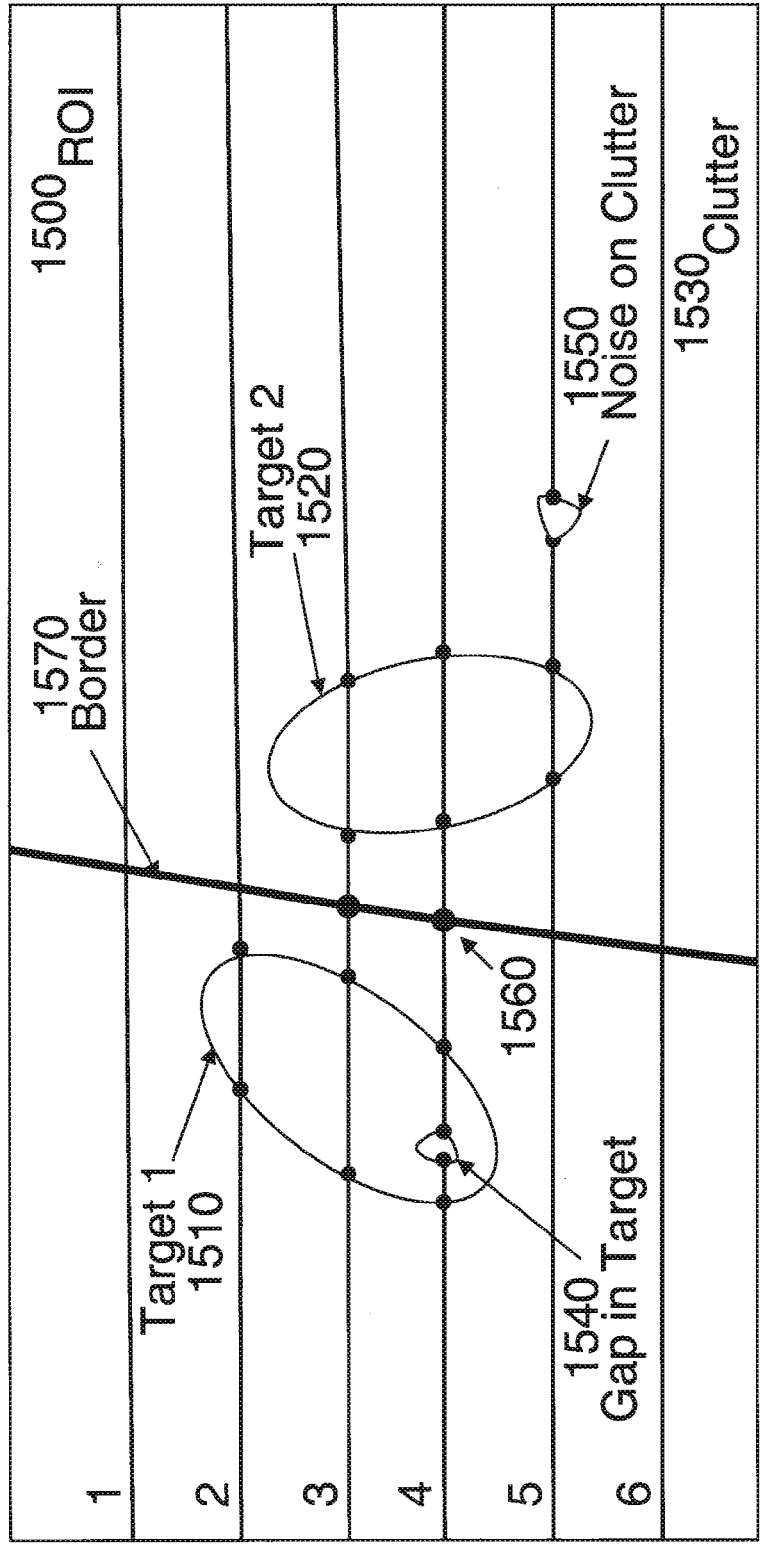
FIG. 15 shows the horizontal grids approach (Algorithm 6) used to separate two targets in an example of the invention.

Algorithm 6 is another topological method of separating targets (see FIG. 15). Suppose we have a chip 1500, with two clusters 1510 and 1520, along with some clutter 1530. Target separation using horizontal grids consists of setting up a grid of horizontal lines (numbered 1-6 in FIG. 15) that encompass the clusters. Then determine where each line crosses each cluster, ignoring small gaps 1540 in clusters and small pieces of noise 1550 in clutter. For those lines that cross both clusters (lines 3 and 4 in FIG. 15), find their midpoints between the clusters (e.g., midpoint 1560 on line 4 between the two clusters). Then connect these midpoints by a border 1570 to separate the two clusters. The following is an example embodiment:

Step 1. Create a horizontal grid in the ROI. A horizontal grid $G_H$ is a set of horizontal lines $L_1, L_2, \ldots, L_{n_H}$, with a constant distance $d_H$ between adjacent lines, which intersects separation area A. The number of lines $n_H$ in the grid (or the distance $d_H$ between adjacent lines) is a parameter of the algorithm (see FIG. 15). Line $L_i$ can be defined by the equation $y=y_i$ in A.

Step 2. Initialize the line number i=1.

Step 3. Calculate $N_i$, the number of times that line $L_i$ intersects cluster C.

There are two types of intersections: input and output. Moving from left to right along line $L_i$ in A, an input intersection is a point on line $L_i$ where clutter area changes to cluster (target) area (i.e., the left pixel is clutter and the right pixel is cluster), while an output intersection is a point on line $L_i$ where cluster area change to clutter. Formally:

Input:$\{(x,y) \epsilon L_i : P(x-1,y)=0 \text{ and } P(x+1,y)>0\}$.

Output:$\{(x,y) \epsilon L_i : P(x-1,y)>0 \text{ and } P(x+1,y)=0\}$

A horizontal grid is shown on FIG. 15. Line $L_3$ has 4 intersections: 2 input and 2 output.

Step 4. Let $N_i$ be the number of intersections on line $L_i$. These $N_i$ intersections break up $L_i$ into $N_i$ intervals (line segments), label them $L_i(0,1), L_i(1,2), \ldots, L(N_i-1, N_i)$. For j=1, 2, ..., $N_i$, calculate the length $\Delta L_i(j, j+1)$, in pixels, of each such interval $L_i(j, j+1)$. If $\Delta L_i(j, j+1)$ is less than a prespecified tolerance $T_L$, then consider $L_i(j, j+1)$ to be noise on clutter or a gap in the target and skip it on the next steps of algorithm (see FIG. 15). Here $T_L$ is a parameter of the algorithm, namely the tolerance of the length of an interval (in pixels).

Step 5. If $N_i<4$, then skip this line. That is, set i=i+1 and return to step 3.

Step 6. Otherwise, if $N_i=4$, calculate the y-coordinate of medium point $B_H^i$ on interval $\Delta L_i(2,3)$ between intersections 2 and 3 (i.e., between the first output intersection and the second input intersection). If $\Delta L_i(1,2)>T_L$, $\Delta L_i(2,3)>T_L$, and $\Delta L_i(3,4)>T_L$, then point $B_H^i$ belongs to the border between targets in the chip.

Go to the next line. That is, set i=i+1 and return to step 3.

Step 7. Finally, if $N_i>4$, determine the index $j_{max}$ of the longest interval $L_i(j_{max}, j_{max}+1)$ between output and input intersections, where $j_{max}$ is an output intersection, $j_{max}+1$ is an input intersection, and $\Delta L_i(j_{max}-1, j_{max})>T_L$, $\Delta L_i(j_{max}, j_{max}+1)>T_L$, and $\Delta L_i(j_{max}+1, j_{max}+2)>T_L$. The medium point $B_H^i$ of $L_i(j_{max}, j_{max}+1)$ belongs to the border between targets in the chip.

Go to the next line. That is, set i=i+1 and return to step 3.

Step 8. If $i>n_H$, there are no more horizontal lines, so connect all points $B_H^i$ by a broken line $B_H$ and extrapolate this broken line to the sides of area A. Note that there must be at least two such points $B_H^i$. Otherwise go directly to step 10.

Step 9. If line $B_H$ does not intersect cluster C (or it has an overlap with the cluster that is less than the tolerance $T_N$), then $B_H$ separates C into two sub-clusters $C_1$ and $C_2$, and $B_H$ is a border between the two targets in the chip. Else, continue to step 10.

Step 10. Create a vertical grid $G_V$ in the ROI in an analogous fashion to that used for the horizontal grid $G_H$ in step 1. That is, there is a set of $n_V$ vertical lines $M_1, M_2, \ldots, M_{n_V}$, with a constant distance $d_V$ between adjacent lines, which intersects separation area A, each line $M_i$ defined by the equation $x=x_i$.

Repeat steps 2-8 for the vertical grid $G_V$ as was done for the horizontal grid $G_H$, resulting in a broken line $B_V$ extrapolated to the sides of area A and going through the points $B_V^i$ (assuming there are at least two such points). If there are not at least two such $B_V^i$, go directly to step 12.

Step 11. If line $B_V$ does not intersect cluster C (or it has an overlap with the cluster that is less than the tolerance $T_N$), then $B_V$ is a border between the two targets in the chip. Else, continue to step 12.

Step 12. Calculate the coordinates of the geometrical center $(x_c, y_c)$ for the set of points $\{B_H^i\} \cup \{B_V^i\}$, assuming at least one such point:

$$x_c = \frac{\sum_{i=1}^{m} x_i}{m}$$

and $$y_c = \frac{\sum_{i=1}^{m} y_i}{m}.$$

Here, $\{B_H^i\} \cup \{B_V^i\}$ is the set of medium points, each in the form $(x_i, y_i)$, on output-input intervals (see steps 6-7) for horizontal and vertical grids and m is the number of such points. Again, m must be nonzero, or Algorithm 6 cannot separate the cluster into sub-clusters.

If lines $B_H$ and $B_V$ do not separate cluster C into two sub-clusters, apply rotating lines (see Algorithm 5) only using the geometrical center $(x_c, y_c)$ as the rotating point (instead of the center of mass). We suppose that, where the previous methods have not proved satisfactory, rotating about the geometrical center $(x_c, y_c)$ does a better cluster separation than rotating about the center of mass.

Note that if computation time is restricted, processing can be limited to using only horizontal grids, or using only vertical grids, but in this case, Algorithm 6 is not effective for some positions of targets in the chip.

Figure 22:
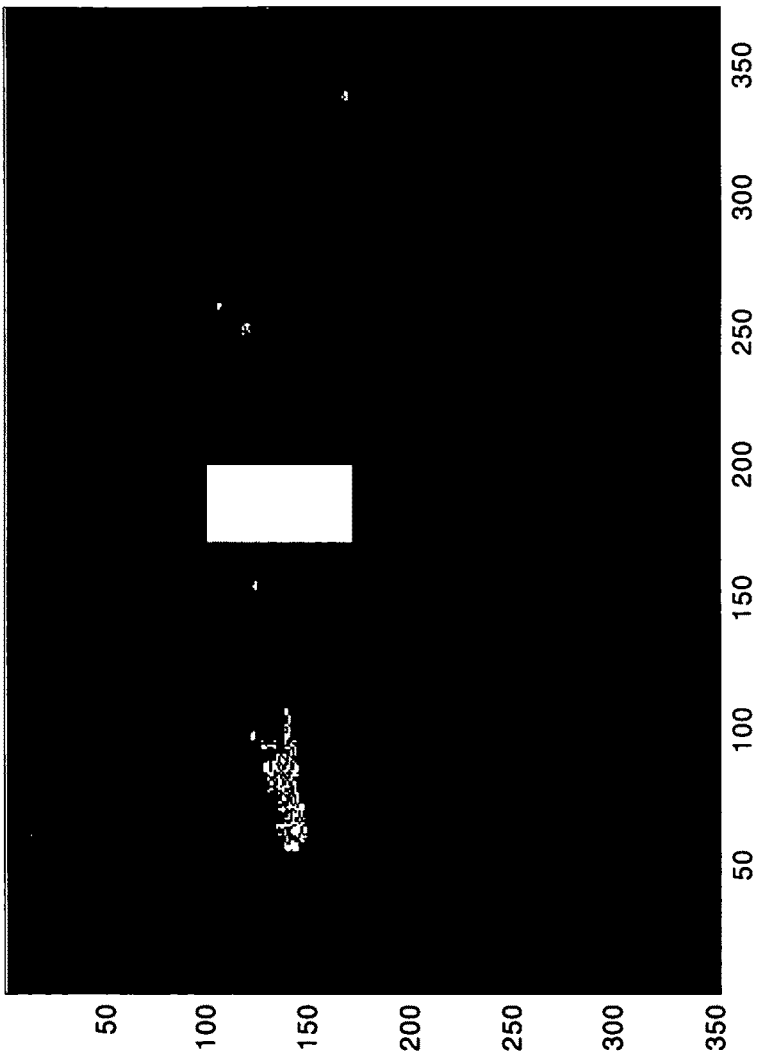
FIG. 22 shows a similarly processed image, only with an artificial object inserted, to test the horizontal grids method (Algorithm 6).
Figure 23:
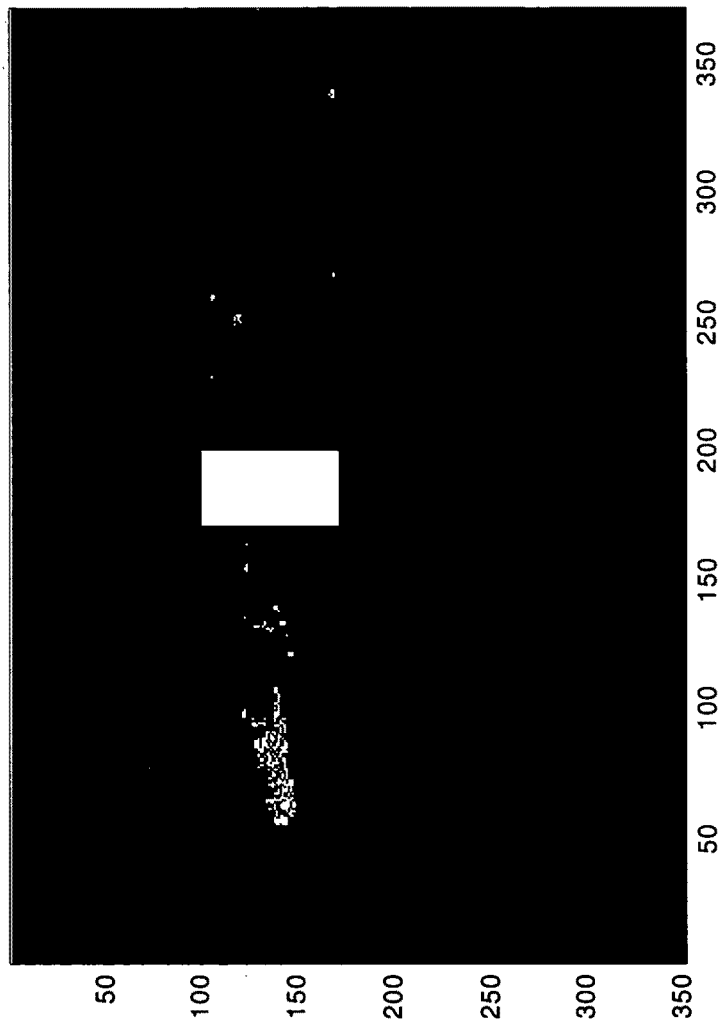
FIG. 23 shows an intermediate step of Algorithm 6 on the same processed image in an exemplary embodiment of the invention.
Figure 24:
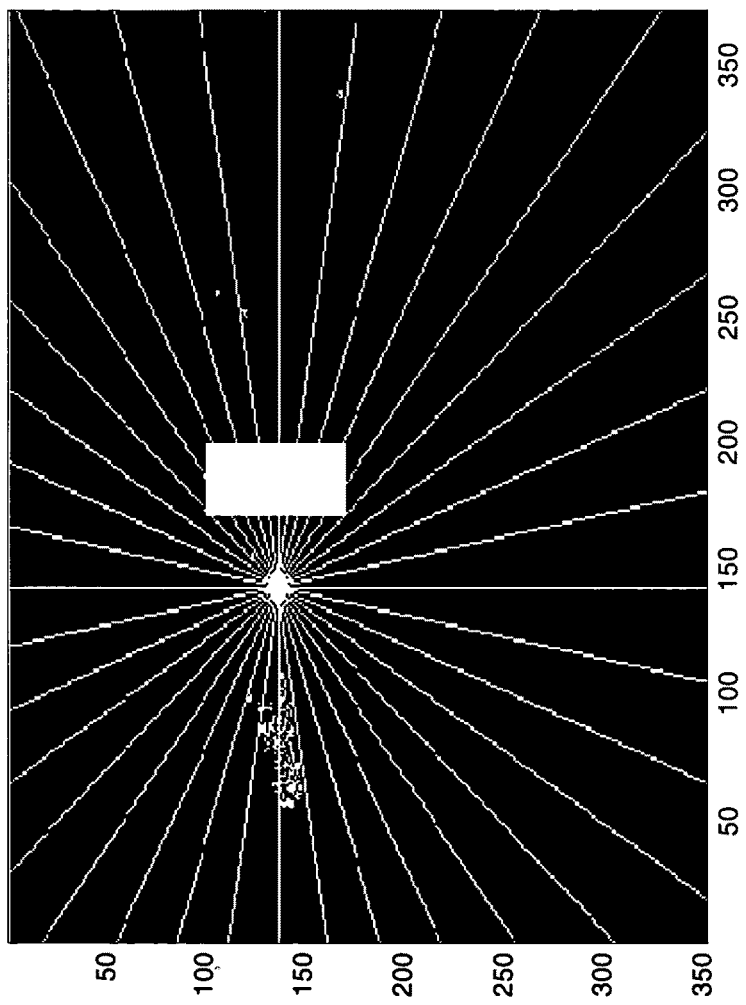
FIG. 24 shows the rotating lines portion after the horizontal grids processing of the same image in an exemplary embodiment of the invention.
Figure 25:
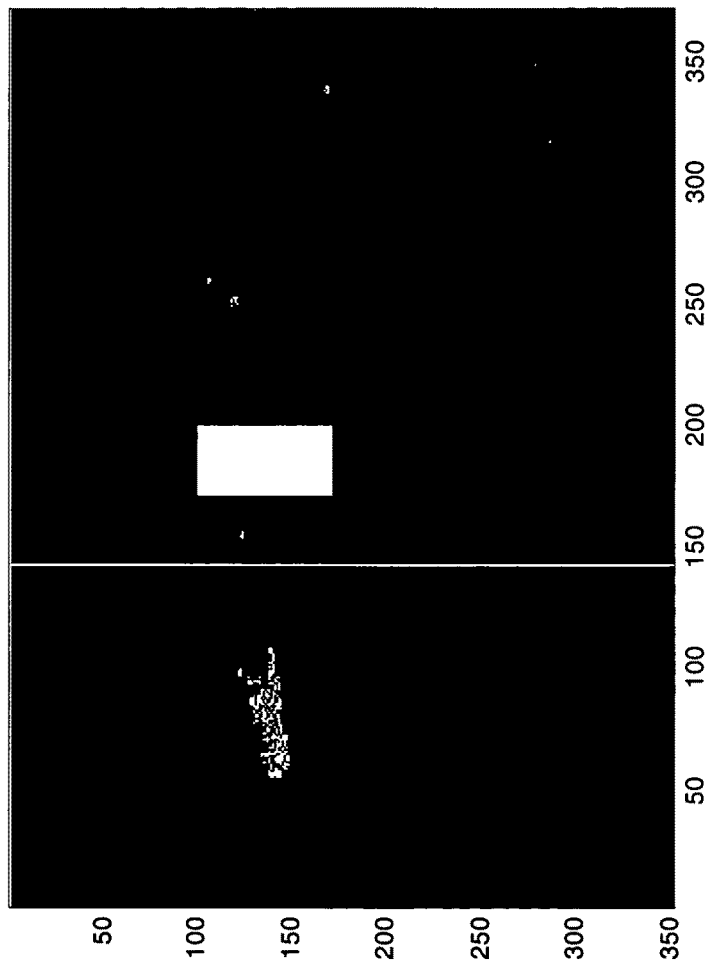
FIG. 25 depicts the resulting separation after completion of the horizontal grids approach on the same image in an exemplary embodiment of the invention.

FIGS. 22-25 demonstrate an example of Algorithm 6. FIG. 22 shows an MSTAR image of two closely spaced targets in the ROI after stage 1. One target is real while the other target is an artificial rectangular target separated from the first target by clutter in the horizontal direction. We create this target for the demonstration of Algorithm 6. FIG. 23 shows the set of points $\{B_H^i\}$ (medium points of output-input intervals for a horizontal grid). FIG. 24 shows a rotation of straight lines around the geometrical center $(x_c, y_c)$. FIG. 25 shows the result of target separation in the ROI using Algorithm 6.

The foregoing description has provided by way of exemplary and non-limiting examples a full and informative description of the exemplary embodiments of this invention. However, various modifications and adaptations may become apparent to those skilled in the relevant art in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An image processor comprising:
   a sensor for sensing and recording a single two-dimensional (2-D) image as 2-D image data, the 2-D image data comprising 2-D pixel locations and corresponding signal magnitudes, one of the signal magnitudes for each of the 2-D pixel locations;
   an automated target cueing component for identifying one or more regions of interest in the single 2-D image;
   a target separation component for separating the 2-D image data in the respective regions of interest; and
   an automated target recognition component for creating target information corresponding to the single 2-D image,
   wherein for each region of the regions of interest the target separation component is configured
      to compute an average signal magnitude as a weighted average of a minimum and a maximum of the respective signal magnitudes of the 2-D pixel locations of the 2-D image data within the region,
      to compare the average signal magnitude to the respective signal magnitudes of the 2-D image data within the region, and
      to distinguish the 2-D image data within the region based on the average signal magnitude.

2. The image processor of claim 1 wherein the target separation component is further configured to separate objects from clutter in one of the regions of interest using the average signal magnitude.

3. The image processor of claim 1 wherein the target separation component is further configured to separate two objects in one of the regions of interest by using the average signal magnitude.

4. The image processor of claim 3 wherein the target separation component is further configured to separate three or more objects in the one of the regions of interest by using the average signal magnitude.

5. The image processor of claim 1 wherein the target separation component is further configured to filter the 2-D image data distinguished by the target separation component.

6. The image processor of claim 1 wherein the target separation component is further configured to restore the 2-D image data distinguished by the target separation component.

7. The image processor of claim 1 wherein the target separation component is further configured to use support vector machines to separate objects in the respective regions of interest.

8. The image processor of claim 1 wherein the target separation component is further configured to use rotating lines about or near a center of mass to separate objects in the respective regions of interest.

9. The image processor of claim 1 wherein the target separation component is further configured to use horizontal or vertical grids to separate two objects in the respective regions of interest.

10. The image processor of claim 1 wherein the target separation component is further configured to use linear or nonlinear borders to separate two or more objects in the respective regions of interest.

11. A method of target separation comprising:
    sensing and recording a single two-dimensional (2-D) image as 2-D image data, the 2-D image data comprising 2-D pixel locations and corresponding signal magnitudes, one of the signal magnitudes for each of the 2-D pixel locations;
    identifying one or more regions of interest in the single 2-D image;
    separating the 2-D image data in the respective regions of interest; and
    recognizing one or more targets and creating target information corresponding to the single 2-D image,
    wherein for each region of the regions of interest the separating of the 2-D image data comprises:
       computing an average signal magnitude as a weighted average of a minimum and a maximum of the respective signal magnitudes of the 2-D pixel locations of the 2-D image data within the region;
       comparing the average signal magnitude to the respective signal magnitudes of the 2-D image data within the region; and
       distinguishing the 2-D image data within the region based on the average signal magnitude.

* * * * *